United States Patent
Proudler et al.

(10) Patent No.: US 7,302,698 B1
(45) Date of Patent: Nov. 27, 2007

(54) OPERATION OF TRUSTED STATE IN COMPUTING PLATFORM

(75) Inventors: Graeme John Proudler, Bristol (GB); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1177 days.

(21) Appl. No.: 09/728,827

(22) Filed: Nov. 28, 2000

Related U.S. Application Data

(63) Continuation of application No. PCT/GB00/03613, filed on Sep. 19, 2000.

(30) Foreign Application Priority Data

Sep. 17, 1999 (EP) .................................. 99307380

(51) Int. Cl.
*H04L 9/32* (2006.01)
(52) U.S. Cl. .......................................... 726/2; 713/187
(58) Field of Classification Search ................ 713/200; 726/2

See application file for complete search history.

(56) References Cited

U.S. PATENT DOCUMENTS

| | | | | |
|---|---|---|---|---|
| 4,747,040 A | * | 5/1988 | Blanset et al. ............... | 718/108 |
| 4,799,156 A | | 1/1989 | Shavit et al. .................. | 705/26 |
| 4,926,476 A | | 5/1990 | Covey ......................... | 713/164 |
| 4,962,533 A | | 10/1990 | Kruger et al. ............... | 711/163 |
| 4,984,272 A | | 1/1991 | McIlroy et al. ............... | 726/17 |
| 5,029,206 A | | 7/1991 | Marino et al. ............... | 713/164 |
| 5,032,979 A | | 7/1991 | Hecht et al. ................. | 364/200 |

(Continued)

FOREIGN PATENT DOCUMENTS

CA 2 187 855 6/1997

(Continued)

OTHER PUBLICATIONS

U.S. Appl. No. 09/920,554, filed Aug. 1, 2001, Proudler.

(Continued)

*Primary Examiner*—Nasser Moazzami
*Assistant Examiner*—David Garcia Cervetti
(74) *Attorney, Agent, or Firm*—Ladas & Parry LLP

(57) ABSTRACT

A computing entity comprises a trusted monitoring component having a first processing means and a first memory means, the trusted monitoring component being a self-contained autonomous data processing unit, and a computer platform having a main processing means and a main memory area, along with a plurality of associated physical and logical resources such as peripheral devices including printers, modems, application programs, operating systems and the like. The computer platform is capable of entering a plurality of different states of operation, each state of operation having a different level of security and trustworthiness. Selected ones of the states comprise trusted states in which a user can enter sensitive confidential information with a high degree of certainty that the computer platform has not been compromised by external influences such as viruses, hackers or hostile attacks. To enter a trusted state, references made automatically to the trusted component, and to exit a trusted state reference must be made to the trusted component. On exiting the trusted state, all references to the trusted state are deleted from the computer platform. On entering the trusted state, the state is entered in a reproducible and known manner, having a reproducible and known configuration which is confirmed by the trusted component.

21 Claims, 12 Drawing Sheets

U.S. PATENT DOCUMENTS

| | | | | |
|---|---|---|---|---|
| 5,038,281 | A | | 8/1991 | Peters ........................ 364/200 |
| 5,136,711 | A | * | 8/1992 | Hugard et al. ................. 713/2 |
| 5,144,660 | A | | 9/1992 | Rose .......................... 726/24 |
| 5,261,104 | A | * | 11/1993 | Bertram et al. ................ 713/1 |
| 5,278,973 | A | * | 1/1994 | O'Brien et al. ............. 717/168 |
| 5,325,529 | A | * | 6/1994 | Brown et al. ............... 709/222 |
| 5,379,342 | A | * | 1/1995 | Arnold et al. ................. 380/2 |
| 5,410,707 | A | * | 4/1995 | Bell ............................. 713/2 |
| 5,414,860 | A | * | 5/1995 | Canova et al. .............. 713/340 |
| 5,440,723 | A | | 8/1995 | Arnold et al. .............. 395/181 |
| 5,448,045 | A | * | 9/1995 | Clark ......................... 235/382 |
| 5,454,110 | A | * | 9/1995 | Kannan et al. ................. 713/2 |
| 5,473,692 | A | | 12/1995 | Davis ........................ 380/25 |
| 5,483,649 | A | * | 1/1996 | Kuznetsov et al. ........... 726/22 |
| 5,495,569 | A | * | 2/1996 | Kotzur ........................ 714/2 |
| 5,497,490 | A | * | 3/1996 | Harada et al. ............. 713/100 |
| 5,497,494 | A | * | 3/1996 | Combs et al. .............. 713/323 |
| 5,504,814 | A | | 4/1996 | Miyahara .................... 713/164 |
| 5,504,910 | A | * | 4/1996 | Wisor et al. ................ 713/322 |
| 5,530,758 | A | | 6/1996 | Marino et al. .............. 713/150 |
| 5,535,411 | A | * | 7/1996 | Speed et al. ..................... 713/2 |
| 5,548,763 | A | * | 8/1996 | Combs et al. .............. 713/323 |
| 5,555,373 | A | * | 9/1996 | Dayan et al. ................. 726/34 |
| 5,577,220 | A | * | 11/1996 | Combs et al. .............. 711/206 |
| 5,652,868 | A | * | 7/1997 | Williams ...................... 703/23 |
| 5,680,452 | A | | 10/1997 | Shanton ...................... 713/167 |
| 5,680,547 | A | | 10/1997 | Chang |
| 5,692,124 | A | | 11/1997 | Holden et al. ................. 726/2 |
| 5,758,174 | A | * | 5/1998 | Crump et al. .............. 713/323 |
| 5,771,354 | A | | 6/1998 | Crawford ................... 709/229 |
| 5,784,549 | A | * | 7/1998 | Reynolds et al. ............. 714/24 |
| 5,787,175 | A | | 7/1998 | Carter ........................ 713/165 |
| 5,841,869 | A | | 11/1998 | Merkling et al. ........... 713/164 |
| 5,845,068 | A | | 12/1998 | Winiger ........................ 726/3 |
| 5,859,911 | A | * | 1/1999 | Angelo et al. .............. 713/187 |
| 5,860,001 | A | * | 1/1999 | Cromer et al. ................. 713/1 |
| 5,887,163 | A | * | 3/1999 | Nguyen et al. ................. 713/2 |
| 5,889,989 | A | | 3/1999 | Robertazzi et al. ......... 718/105 |
| 5,892,900 | A | | 4/1999 | Ginter et al. ................. 726/26 |
| 5,892,902 | A | * | 4/1999 | Clark ............................ 726/5 |
| 5,892,906 | A | | 4/1999 | Chou et al. ................... 726/19 |
| 5,892,959 | A | | 4/1999 | Fung .......................... 713/323 |
| 5,910,180 | A | * | 6/1999 | Flory et al. ................. 719/321 |
| 5,922,074 | A | | 7/1999 | Richard et al. ............... 726/21 |
| 5,923,841 | A | * | 7/1999 | Lee ............................. 726/19 |
| 5,935,251 | A | * | 8/1999 | Moore ......................... 726/18 |
| 5,953,422 | A | * | 9/1999 | Angelo et al. .............. 713/185 |
| 5,960,177 | A | | 9/1999 | Tanno ................... 395/200.59 |
| 5,978,912 | A | * | 11/1999 | Rakavy et al. ................. 713/2 |
| 5,987,605 | A | * | 11/1999 | Hill et al. ..................... 713/2 |
| 6,012,080 | A | | 1/2000 | Ozden et al. ................ 718/102 |
| 6,023,765 | A | | 2/2000 | Kuhn ............................ 726/4 |
| 6,047,373 | A | * | 4/2000 | Hall et al. ..................... 713/1 |
| 6,067,559 | A | | 5/2000 | Allard et al. ................ 709/202 |
| 6,067,618 | A | | 5/2000 | Weber ........................... 713/2 |
| 6,076,118 | A | * | 6/2000 | Klein .......................... 710/10 |
| 6,079,016 | A | * | 6/2000 | Park .............................. 713/2 |
| 6,081,894 | A | | 6/2000 | Mann .......................... 713/188 |
| 6,088,794 | A | * | 7/2000 | Yoon et al. ..................... 713/2 |
| 6,098,158 | A | * | 8/2000 | Lay et al. ................... 711/162 |
| 6,125,114 | A | | 9/2000 | Blanc et al. ................. 370/389 |
| 6,138,239 | A | | 10/2000 | Veil ............................ 713/200 |
| 6,148,387 | A | * | 11/2000 | Galasso et al. .............. 711/203 |
| 6,157,719 | A | | 12/2000 | Wasilewski et al. ........ 380/210 |
| 6,175,917 | B1 | * | 1/2001 | Arrow et al. ................... 713/1 |
| 6,178,503 | B1 | * | 1/2001 | Madden et al. ................. 713/2 |
| 6,185,678 | B1 | * | 2/2001 | Arbaugh et al. ................ 713/2 |
| 6,205,547 | B1 | * | 3/2001 | Davis ............................ 713/1 |
| 6,230,285 | B1 | * | 5/2001 | Sadowsky et al. ............ 714/14 |
| 6,243,809 | B1 | * | 6/2001 | Gibbons et al. ................ 713/1 |
| 6,272,631 | B1 | | 8/2001 | Thomlinson et al. ........ 713/155 |
| 6,275,848 | B1 | | 8/2001 | Arnold ........................ 709/206 |
| 6,279,120 | B1 | * | 8/2001 | Lautenbach-Lampe et al. .. 714/15 |
| 6,304,970 | B1 | * | 10/2001 | Bizzaro et al. ................. 726/2 |
| 6,308,264 | B1 | * | 10/2001 | Rickey ......................... 713/2 |
| 6,317,798 | B1 | * | 11/2001 | Graf ........................... 710/15 |
| 6,324,644 | B1 | * | 11/2001 | Rakavy et al. ................. 713/1 |
| 6,327,579 | B1 | | 12/2001 | Crawford .................... 705/400 |
| 6,327,652 | B1 | | 12/2001 | England et al. ................ 713/2 |
| 6,330,669 | B1 | * | 12/2001 | McKeeth ....................... 713/1 |
| 6,334,118 | B1 | | 12/2001 | Benson ....................... 713/167 |
| 6,353,885 | B1 | * | 3/2002 | Herzi et al. .................... 713/1 |
| 6,367,012 | B1 | | 4/2002 | Atkinson et al. ........... 713/176 |
| 6,393,412 | B1 | | 5/2002 | Deep .......................... 705/400 |
| 6,393,560 | B1 | * | 5/2002 | Merrill et al. ................. 713/2 |
| 6,401,202 | B1 | * | 6/2002 | Abgrall ........................ 713/2 |
| 6,421,776 | B1 | * | 7/2002 | Hillis et al. .................... 713/2 |
| 6,446,203 | B1 | * | 9/2002 | Aguilar et al. ................. 713/2 |
| 6,449,716 | B1 | * | 9/2002 | Rickey ......................... 713/2 |
| 6,477,642 | B1 | * | 11/2002 | Lupo ............................. 713/2 |
| 6,477,702 | B1 | | 11/2002 | Yellin et al. ................ 717/126 |
| 6,484,262 | B1 | * | 11/2002 | Herzi .......................... 726/34 |
| 6,487,601 | B1 | * | 11/2002 | Hubacher et al. ........... 709/229 |
| 6,490,677 | B1 | * | 12/2002 | Aguilar et al. ................. 713/1 |
| 6,496,847 | B1 | * | 12/2002 | Bugnion et al. .............. 718/1 |
| 6,505,300 | B2 | | 1/2003 | Chan et al. .................. 713/164 |
| 6,513,156 | B2 | | 1/2003 | Bak et al. ................... 717/151 |
| 6,519,623 | B1 | * | 2/2003 | Mancisidor ................. 718/100 |
| 6,529,966 | B1 | * | 3/2003 | Willman et al. .............. 710/10 |
| 6,530,024 | B1 | | 3/2003 | Proctor ........................ 726/23 |
| 6,560,706 | B1 | * | 5/2003 | Carbajal et al. ............. 713/155 |
| 6,560,726 | B1 | * | 5/2003 | Vrhel et al. ................... 714/55 |
| 6,609,248 | B1 | | 8/2003 | Srivastava et al. .......... 717/147 |
| 6,622,018 | B1 | | 9/2003 | Erekson ...................... 455/420 |
| 6,671,716 | B1 | | 12/2003 | Diedrechsen et al. ........ 709/203 |
| 6,678,712 | B1 | * | 1/2004 | McLaren et al. ............ 718/100 |
| 6,681,304 | B1 | | 1/2004 | Vogt et al. ................... 711/164 |
| 6,684,326 | B1 | * | 1/2004 | Cromer et al. ................. 713/2 |
| 6,701,440 | B1 | | 3/2004 | Kim et al. .................... 726/24 |
| 6,711,686 | B1 | * | 3/2004 | Barrett ........................ 713/184 |
| 6,727,920 | B1 | * | 4/2004 | Vineyard et al. ............ 715/810 |
| 6,732,276 | B1 | | 5/2004 | Cofler et al. ................ 713/200 |
| 6,735,696 | B1 | * | 5/2004 | Hannah ....................... 713/189 |
| 6,751,680 | B2 | | 6/2004 | Langerman et al. ........... 710/3 |
| 6,757,824 | B1 | | 6/2004 | England ....................... 713/156 |
| 6,757,830 | B1 | | 6/2004 | Tarbotton et al. ........... 713/188 |
| 6,775,779 | B1 | | 8/2004 | England et al. ............. 713/200 |
| 6,810,478 | B1 | * | 10/2004 | Anand et al. .................. 713/2 |
| 6,892,307 | B1 | | 5/2005 | Wood et al. .................. 726/8 |
| 6,931,545 | B1 | | 8/2005 | Ta et al. ...................... 713/156 |
| 6,948,069 | B1 | | 9/2005 | Teppler ....................... 713/178 |
| 6,965,816 | B2 | | 11/2005 | Walker ......................... 701/16 |
| 2001/0037450 | A1 | | 11/2001 | Metlitski et al. ............ 713/152 |
| 2002/0012432 | A1 | | 1/2002 | England et al. ............. 380/231 |
| 2002/0023212 | A1 | | 2/2002 | Proudler ..................... 713/164 |
| 2002/0042874 | A1 | | 4/2002 | Arora ......................... 712/229 |
| 2002/0069354 | A1 | | 6/2002 | Fallon et al. ................... 713/2 |
| 2002/0184486 | A1 | | 12/2002 | Kerschenbaum et al. .... 713/150 |
| 2002/0184520 | A1 | | 12/2002 | Bush et al. .................. 713/200 |
| 2003/0084436 | A1 | | 5/2003 | Berger et al. ............... 717/174 |
| 2003/0145235 | A1 | | 7/2003 | Choo .......................... 713/201 |
| 2003/0191957 | A1 | | 10/2003 | Hypponen et al. .......... 713/200 |
| 2003/0196110 | A1 | | 10/2003 | Lampson et al. ............ 713/200 |
| 2004/0045019 | A1 | | 3/2004 | Bracha et al. ............... 719/332 |
| 2004/0073617 | A1 | | 4/2004 | Milliken et al. ............. 709/206 |
| 2004/0148514 | A1 | | 7/2004 | Fee et al. .................... 713/200 |
| 2005/0256799 | A1 | | 11/2005 | Warsaw et al. ................ 705/37 |

FOREIGN PATENT DOCUMENTS

| | | |
|---|---|---|
| EP | 0 421 409 A2 | 4/1991 |
| EP | 0 580 350 A1 | 1/1994 |
| EP | 0 849 657 | 6/1998 |

| | | |
|---|---|---|
| EP | 0 465 016 | 12/1998 |
| EP | 0 893 751 A1 | 1/1999 |
| EP | 0 992 958 A2 | 4/2000 |
| EP | 1 056 014 A1 | 8/2000 |
| EP | 1 049 036 A2 | 11/2000 |
| EP | 1 076 279 A1 | 2/2001 |
| EP | 1 107 137 A2 | 6/2001 |
| GB | 2 317 476 A | 3/1998 |
| GB | 2 336 918 A | 11/1999 |
| GB | 0020441.2 | 8/2000 |
| GB | 2 353 885 A1 | 3/2001 |
| GB | 2 361 153 A | 10/2001 |
| WO | 94/11967 A1 | 5/1994 |
| WO | 95/24696 | 9/1995 |
| WO | 97/29416 A2 | 8/1997 |
| WO | 98/15082 | 4/1998 |
| WO | 98/26529 | 6/1998 |
| WO | 98/36517 | 8/1998 |
| WO | 98/40809 A2 | 9/1998 |
| WO | 00/19324 A1 | 4/2000 |
| WO | 00/48062 | 8/2000 |
| WO | 00/52900 A1 | 9/2000 |
| WO | 00/54125 | 9/2000 |
| WO | 00/54126 | 9/2000 |
| WO | 00/58859 | 10/2000 |
| WO | 00/73913 A1 | 12/2000 |
| WO | 01/09781 A2 | 2/2001 |
| WO | 01/27722 A1 | 4/2001 |
| WO | 01/65366 A1 | 9/2001 |

OTHER PUBLICATIONS

U.S. Appl. No. 10/075,444, filed Feb. 15, 2002, Brown et al.
U.S. Appl. No. 10/080,466, filed Feb. 22, 2002, Pearson et al.
U.S. Appl. No. 10/165,840, filed Jun. 7, 2002, Dalton.
U.S. Appl. No. 10/175,183, filed Jun. 18, 2002, Griffin et al.
U.S. Appl. No. 10/175,185, filed Jun. 18, 2002, Pearson et al.
U.S. Appl. No. 10/175,395, filed Jun. 18, 2002, Pearson et al.
U.S. Appl. No. 10/175,542, filed Jun. 18, 2002, Griffin et al.
U.S. Appl. No. 10/175,553, filed Jun. 18, 2002, Griffin et al.
U.S. Appl. No. 10/206,812, filed Jul. 26, 2002, Proudler.
U.S. Appl. No. 10/240,137, filed Sep. 26, 2002, Dalton et al.
U.S. Appl. No. 10/240,139, filed Sep. 26, 2002, Choo et al.
U.S. Appl. No. 10/303,690, filed Nov. 21, 2002, Proudler et al.
U.S. Appl. No. 09/979,902, filed Nov. 27, 2001, Proudler et al.
U.S. Appl. No. 09/979,903, filed Nov. 27, 2001, Proudler et al.
U.S. Appl. No. 10/080,476, filed Feb. 22, 2002, Proudler et al.
U.S. Appl. No. 10/080,477, filed Feb. 15, 2002, Brown et al.
U.S. Appl. No. 10/080,478, filed Feb. 22, 2002, Pearson et al.
U.S. Appl. No. 10/080,479, filed Feb. 22, 2002, Pearson et al.
U.S. Appl. No. 10/194,831, filed Jul. 11, 2002, Chen et al.
U.S. Appl. No. 10/208,718, filed Jul. 29, 2002, Chen et al.
U.S. Appl. No. 10/240,138, filed Sep. 26, 2002, Choo.
Barkley, J., et al., "Managing Role/Permission Relationships Using Object Access Types," *ACM*, pp. 73-80, Jul. 1998, retrieved Jun. 25, 2005.
Grimm, R., et al., "Separating Access Control Policy, Enforcement, and Functionality in Extensible Systems," *ACM* pp. 36-70, Feb. 2001, retrieved Jun. 25, 2005.
Jaeger, T., et al., "Requirements of Role-Based Access Control for Collaborative Systems," *ACM*, pp. 53-64, Dec. 1996, retrieved Jun. 25, 2005.
Naor, M., et al., "Secure and Efficient Metering," Internet: <http://citeseer.nj.com/naor98secure.html> Sections 1-1.3 (1998).
P.C Magazine Online; The 1999 Utility Guide: Desktop Antivirus; Norton Antivirus 5.0 DeLux, Internet.

The Trusted Computing Platform Alliance, "Building Foundation of Trust in the PC,", 9 pages, located at Internet address <www.trustedpc.org/home/home.html.> (Jan. 2000).
Zhang, N.X., et al., "Secure Code Distribution," pp. 76-79, 1997 IEEE, retrieved Jun. 25, 2005.
Ford, B., et al., "Microkernels Meet Recursive Virtual Machines", Operating Systems Review, ACM, vol. 30, No. Special Issue, pp. 137-151 (Dec. 21, 1996).
Goldberg, R.P., "Survey of Virtual Machine Research", Computer, IEEE Service Center, vol. 7, No. 6, pp. 34-45 (Jun. 1974).
Popek, G. J., "Formal Requirements for Virtualizable Third Generation Architectures", Communications of the Association for Computing Machinery, ACM, vol. 17, No. 7, pp. 412-421 (Jul. 1974).
EDS Timeline, The 1960's, at EDS.com.
Choo, T.H., et al., "Trusted Linux: A Secure Platform for Hosting Compartmented Applications, " *Enterprise Solutions*, pp. 1-14 (Nov./Dec. 2001).
Dalton, C., et al., "An operating system approach to securing e-services," *Communications of the ACM*, vol. 44, Issue 2 (Feb. 2001).
Dalton, C., et al., "Applying Military Grade Security to the Internet," *Computer Networks and ISND Systems*, vol. 29, pp. 1799-1808 (1997).
Dalton, C.I., et al., "Design of secure UNIX," Elsevier Information Security Report, (Feb. 1992).
Hallyn, S.E., et al., "Domain and Type Enforcement for Linux," Internet: <http://www.usenix.org/publications/library/proceedings/als2000/full_papers/hallyn/hallyn_html/>. (Retrieved Apr. 24, 2002).
Loscocco, P., et al., "Integrating Flexible Support for Security Policies into the Linux Operating System," Internet: <www.nsa.gov/selinux> (Retrieved Apr. 24, 2002).
Milojicic, D., et al., "Process Migration," Internet: <http://www.hpl.hp.com/techreports/1999/HPL-1999-21.html.> pp. 1-48 (Dec. 5, 1998).
Scheibe, M., "TCPA Security: Trust your Platform!" *Quarterly Focus PC Security*, pp. 44-47. Internet: <http://www.silicon-trust.com/pdf/secure_PDF/Seite_44-47.pdf>.
Senie, D., "Using the Sock_Packet mechanism in Linux to gain complete control of an Ethernet Interface," Internet: <http://www.senie.com/dan/technology/sock_packet.html>. (Retrieved Apr. 24, 2002).
Yee, B., "Using Secure Coprocessors," Doctoral thesis—Carnegie Mellon University, pp. 1-94 (May 1994).
*Boot Integrity Services Application Programming Interface*, Version 1.0, Intel Corporation, pp. 1-60 (Dec. 28, 1998).
"NIST Announces Technical Correction to Secure Hash Standard," Internet: <http://www.nist.gov/public_affairs/releases/hashstan.htm> pp. 1-2 (Oct. 24, 2002).
"Norton AntiVirus 5.0 Delux," *PC Magazine Online; The 1999 Utility Guide: Desktop Antivirus*, pp. 1-2, Internet: <http://wwww.zdnet.com/pcmag/features/utilities99/deskav07.html> (Retrieved Nov. 30, 2001).
"Secure Execution Environments, Internet Safety through Type-Enforcing Firewalls," Internet: <thp://www.ghp.com/research/nailabs/secure-execution/internet-safety.asp> (Retrieved Apr. 24, 2002).
*Sophos Anti-Virus for Notes/Domino Release Notes*, Version 2.0, pp. 1-2, Internet: <http://www.sophos.com/sophos/products/full/readmes/readnote.txt> (Retrieved Nov. 30, 2001).
*Trusted Computing Platform Alliance (TCPA), TCPA Design Philosophies and Concepts*, Version 1.0, Internet: <www.trustedpc.org> pp. 1-30 (Jan. 2001).

\* cited by examiner

OPERATION OF TRUSTED STATE IN COMPUTING PLATFORM

This application is being filed as a continuation of co-pending PCT International Patent Application No. PCT/GB00/03613 (filed on 19 Sep. 2000), which PCT application claims priority to EP Application No. 99307380.8 (filed on 17 Sep. 1999).

CROSS REFERENCE TO RELATED APPLICATIONS

The subject matter of the present application may also be related to the following U.S. patent applications: "Performance of a Service on a Computing Platform," Ser. No. 09/920,554, filed Aug. 1, 2001; "Secure E-Mail Handling Using a Compartmented Operating System," Ser. No. 10/075,444, filed Feb. 15, 2002; "Electronic Communication," Ser. No. 10/080,466, filed Feb. 22, 2002; "Demonstrating Integrity of a Compartment of a Compartmented Operating System," Ser. No. 10/165,840, filed Jun. 7, 2002; "Multiple Trusted Computing Environments with Verifiable Environment Entities," Ser. No. 10/175,183, filed Jun. 18, 2002; "Renting a Computing Environment on a Trusted Computing Platform," Ser. No. 10/175,185, filed Jun. 18, 2002; "Interaction with Electronic Services and Markets," Ser. No. 10/175,395, filed Jun. 18, 2002; "Multiple Trusted Computing Environments," Ser. No. 10/175,542, filed Jun. 18, 2002; "Performing Secure and Insecure Computing Operations in a Compartmented Operating System," Ser. No. 10/175,553, filed Jun. 18, 2002; "Privacy of Data on a Computer Platform," Ser. No. 10/206,812, filed Jul. 26, 2002; "Trusted Operating System," Ser. No. 10/240,137, filed Sep. 26, 2002; "Trusted Gateway System," Ser. No. 10/240,139, filed Sep. 26, 2002; and "Apparatus and Method for Creating a Trusted Environment," Ser. No. 10/303,690, filed Nov. 21, 2002.

FIELD OF THE INVENTION

The present invention relates to the field of computers, and particularly, although not exclusively, to a computing entity which can be placed into a trusted state, and a method of operating the computing entity to achieve the trusted state, and operation of the computing entity when in the trusted state.

BACKGROUND TO THE INVENTION

Conventional prior art mass market computing platforms include the well-known personal computer (PC) and competing products such as the Apple Macintosh™, and a proliferation of known palm-top and laptop personal computers. Generally, markets for such machines fall into two categories, these being domestic or consumer, and corporate. A general requirement for a computing platform for domestic or consumer use is a relatively high processing power, Internet access features, and multi-media features for handling computer games. For this type of computing platform, the Microsoft Windows® '95 and '98 operating system products and Intel processors dominate the market.

On the other hand, for business use, there are a plethora of available proprietary computer platform solutions available aimed at organizations ranging from small businesses to multi-national organizations. In many of these applications, a server platform provides centralized data storage, and application functionality for a plurality of client stations. For business use, other key criteria are reliability, networking features, and security features. For such platforms, the Microsoft Windows NT 4.0™ operating system is common, as well as the Unix™ operating system.

With the increase in commercial activity transacted over the Internet, known as "e-commerce", there has been much interest in the prior art in enabling data transactions between computing platforms over the Internet. However, because of the potential for fraud and manipulation of electronic data, in such proposals, fully automated transactions with distant unknown parties on a wide-spread scale as required for a fully transparent and efficient market place have so far been held back. The fundamental issue is one of trust between interacting computer platforms for the making of such transactions.

There have been several prior art schemes which are aimed at increasing the security and trustworthiness of computer platforms. Predominantly, these rely upon adding in security features at the application level, that is to say the security features are not inherently imbedded in the kernel of operating systems, and are not built in to the fundamental hardware components of the computing platform. Portable computer devices have already appeared on the market which include a smart card, which contains data specific to a user, which is input into a smart card reader on the computer. Presently, such smart cards are at the level of being add-on extras to conventional personal computers, and in some cases are integrated into a casing of a known computer. Although these prior art schemes go some way to improving the security of computer platforms, the levels of security and trustworthiness gained by prior art schemes may be considered insufficient to enable widespread application of automated transactions between computer platforms. For businesses to expose significant value transactions to electronic commerce on a widespread scale, they require confidence in the trustworthiness of the underlying technology.

Prior art computing platforms have several problems which stand in the way of increasing their inherent security:
  The operating status of a computer system or platform and the status of the data within the platform or system is dynamic and difficult to predict. It is difficult to determine whether a computer platform is operating correctly because the state of the computer platform and data on the platform is constantly changing and the computer platform itself may be dynamically changing.
  From a security point of view, commercial computer platforms, in particular client platforms, are often deployed in environments which are vulnerable to unauthorized modification. The main areas of vulnerability include modification by software loaded by a user, or via a network connection. Particularly, but not exclusively, conventional computer platforms may be vulnerable to attack by virus programs, with varying degrees of hostility.
  Computer platforms may be upgraded or their capabilities may be extended or restricted by physical modification, i.e. addition or deletion of components such as hard disk drives, peripheral drivers and the like.

It is known to provide security features for computer systems, which are embedded in operating software. These security features are primarily aimed at providing division of information within a community of users of the system. In the known Microsoft Windows NT™ 4.0 operating system, there exists a monitoring facility called a "system log event viewer" in which a log of events occurring within the platform is recorded into an event log data file which can be inspected by a system administrator using the windows NT operating system software. This facility goes some way to enabling a system administrator to security monitor pre-selected events. The event logging function in the Windows NT™ 4.0 operating system provides system monitoring.

In terms of overall security of a computer platform, a purely software based system is vulnerable to attack, for example by viruses of which there are thousands of different varieties. Several proprietary virus finding and correcting applications are known, for example the Dr Solomons™ virus toolkit program The Microsoft Windows NT™ 4.0 software includes a virus guard software, which is preset to look for known viruses. However, virus strains are developing continuously, and the virus guard software will not give reliable protection against newer unknown viruses. New strains of virus are being developed and released into the computing and internet environment on an ongoing basis.

Further, prior art monitoring systems for computer entities focus on network monitoring functions, where an administrator uses network management software to monitor performance of a plurality of network computers. In these known systems, trust in the system does not reside at the level of individual trust of each hardware unit of each computer platform in a system.

SUMMARY OF THE INVENTION

One object of the present invention is to provide a computing entity in which a third party user can have a high degree of confidence that the computing entity has not been corrupted by an external influence, and is operating in a predictable and known manner.

Another object of the present invention is to simplify a task of judging whether a trustworthiness of a computing entity is sufficient to perform a particular task or set of tasks or type of task.

In specific implementations of the present invention, a computing entity is capable of residing in a plurality of distinct operating states. Each operating state can be distinguished from other operating states using a set of integrity metrics designed to distinguish between those operating states.

According to first aspect of the present invention there is provided a computing entity comprising:

a computer platform comprising a plurality of physical and logical resources including a first data processor and a first memory means;

a monitoring component comprising a second data processor and a second memory means;

wherein, said computer platform is capable of operating in a plurality of different states, each said state utilising a corresponding respective set of individual ones of said physical and logical resources;

wherein said monitoring component operates to determine which of said plurality of states said computer platform operates in.

Preferably a said memory means contains a set of instructions for configuration of said plurality of physical and logical resources of said computer platform into said pre-determined state.

Preferably exit of said computer platform from said pre-determined state is monitored by said monitoring component.

A BIOS (Basic Input Output System) may be provided within the monitoring component itself. By providing the BIOS file within the monitoring component, the BIOS file may be inherently trusted.

In an alternative embodiment, said computer platform may comprise an internal firmware component configured to compute a digest data of a BIOS file data stored in a predetermined memory space occupied by a BIOS file of said computer platform.

According to second aspect of the present invention there is provided a method of activating a computing entity comprising a computer platform having a first data processing means and a first memory means and a monitoring component having a second data processing means and a second memory means, into an operational state of a plurality of pre-configured operational states into which said computer platform can be activated, said method comprising the steps of:

selecting a state of said plurality of pre-configured operational states into which to activate said computer platform;

activating said computer platform into said selected state according to a set of stored instructions; and wherein said monitoring component monitors activation into said selected state by recording data describing which of said plurality of pre-configured states said computer platform is activated into.

Said monitoring component may continue to monitor said selected state after said computer platform has been activated to said selected state.

Said monitoring component may generate a state signal in response to a signal input directly to said monitoring component by a user of said computing entity, said state signal containing data describing which said state said computer platform has entered.

In one embodiment, said set of stored instructions which allow selection of said state may be stored in a BIOS file resident within said monitoring component. Once selection of a said state has been made, activation of the state may be carried out by a set of master boot instructions which are themselves activated by the BIOS.

Preferably the method comprises the step of generating a menu for selection of a said pre-configured state from said plurality of pre-configured states.

The method may comprise the step of generating a user menu displayed on a user interface for selection of a said pre-configured state from said plurality of pre-configured states, and said step of generating a state signal comprises generating a state signal in response to a user input accepted through said user interface.

Alternatively, the predetermined state may be automatically selected by a set of instructions stored on a smartcard, which selects a state option generated by said BIOS. The selection of states may be made automatically via a set of selection instructions to instruct said BIOS to select a state from said set of state options generated by said BIOS.

Said step of monitoring a said state may comprise:

immediately before activating said computer platform, creating by means of a firmware component a digest data of a first pre-allocated memory space occupied by a BIOS file of said computer platform;

writing said digest data to a second pre-allocated memory space to which only said firmware component has write access; and said monitoring component reading said digest data from said second pre-allocated memory space.

Said step of monitoring a said state into which said computer platform is activated may comprise:

executing a firmware component to compute a digest data of a BIOS file of said computer platform;

writing said digest data to a predetermined location in said second memory means of said monitoring component.

Said step of activating said computer platform into said selected state may comprise:

at a memory location of said first memory means, said location occupied by a BIOS file of said computer platform, storing an address of said monitoring component which transfers control of said first processor to said monitoring component;

storing in said monitoring component a set of native instructions which are accessible immediately after reset of said first processor, wherein said native instructions instruct said first processor to calculate a digest of said BIOS file and store said digest data in said second memory means of said monitoring component; and said monitoring component passing control of said activation process to said BIOS file, once said digest data is stored in said second memory means.

Said step of monitoring said state into which said computer platform is activated may comprise:

after said step of activating said computer platform into said selected state, monitoring a plurality of logical and physical components to obtain a first set of metric data signals from those components, said metric data signals describing a status and condition of said components;

comparing said first set of metric data signals determined from said plurality of physical and logical components of said computer platform, with a set of prerecorded metric data stored in a memory area reserved for access only by said monitoring component; and comparing said first set of metric data signals obtained directly from said plurality of physical and logical components with said set of pre-stored metric data signals stored in said reserved memory area.

According to a third aspect of the present invention there is provided a method of operating a computing entity comprising a computer platform having a first data processing means and a first memory means, and a monitoring component having a second data processing means and a second memory means, such that said computer platform enters one of a plurality of possible pre-determined operating states said method comprising the steps of:

in response to an input from a user interface, generating a state signal, said state signal describing a selected state into which said computer platform is to be activated into;

activating said computer platform into a pre-determined state, in which a known set of physical and logical resources are available for use in said state and known processes can operate in said state;

from said pre-determined state, entering a configuration menu for reconfiguration of said monitoring component; and modifying a configuration of said monitoring component by entering data via a user interface in accordance with an instruction set comprising said configuration menu.

Said step of entering said monitoring component configuration menu may comprise:

entering a confirmation key signal directly into said monitoring component, said confirmation key signal generated in response to a physical activation of a confirmation key.

Said step of entering said monitoring component configuration menu may comprise entering a password to said trusted component via a user interface.

According to a fourth aspect of the present invention there is provided a method of operation of a computing entity comprising a monitoring component having a first data processing means and a first memory means, and a computer platform having a second data processing means and a second memory means, said method comprising the steps of:

entering a first state of said computer entity, wherein in said first state are available a plurality of pre-selected physical and logical resources;

commencing a user session in said first state, in which said user session a plurality of data inputs are received by said computer platform, said second data processing means performing data processing on said received data; reconfiguring said plurality of physical and logical resources according to instructions received in said session;

generating a session data describing a configuration of said physical and logical resources;

generating a plurality of user data resulting from processes operating within said session;

storing said user data;

storing session data;

exiting said session; and exiting said computer platform from said state.

Said method may further comprise the step of reconfiguring said monitoring component during said user session in said first state. Thus, the monitoring component may be reconfigured from a trusted state of the computer platform.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

Figure 1:
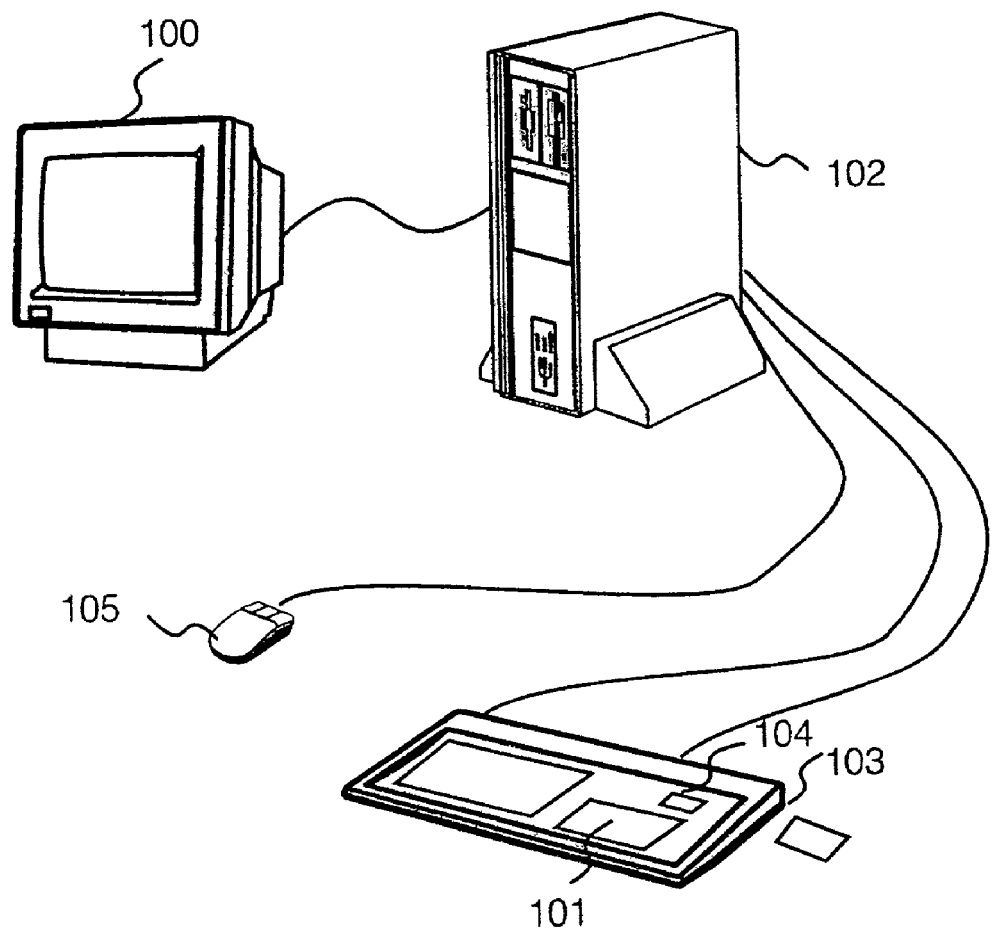
FIG. 1 illustrates schematically a computer entity according to first specific embodiment of the present invention.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific embodiments of the present invention comprise a computer platform having a processing means and a memory means, and which is physically associated with a component, known herein after as a "trusted component" which monitors operation of the computer platform by collecting metrics data from the computer platform, and which is capable of verifying to third party computer entities interacting with the computer platform to the correct functioning of the computer platform.

Two computing entities each provisioned with such a trusted component, may interact with each other with a high degree of 'trust'. That is to say, where the first and second computing entities interact with each other the security of the interaction is enhanced compared to the case where no trusted component is present, because:

A user of a computing entity has higher confidence in the integrity and security of his/her own computer entity and in the integrity and security of the computer entity belonging to the other computing entity.

Each entity is confident that the other entity is in fact the entity which it purports to be.

Where one or both of the entities represent a party to a transaction, e.g. a data transfer transaction, because of the in-built trusted component, third party entities interacting with the entity have a high degree of confidence that the entity does in fact represent such a party.

The trusted component increases the inherent security of the entity itself, through verification and monitoring processes implemented by the trusted component.

The computer entity is more likely to behave in the way it is expected to behave.

In this specification, the term "trusted" when used in relation to a physical or logical component, is used to mean a physical or logical component which always behaves in an expected manner. The behavior of that component is predictable and known. Trusted components have a high degree of resistance to unauthorized modification.

In this specification, the term "computer platform" is used to refer to at least one data processor and at least one data storage means, usually but not essentially with associated communications facilities e.g. a plurality of drivers, associated applications and data files, and which may be capable of interacting with external entities e.g. a user or another computer entity, for example by means of connection to the internet, connection to an external network, or by having an input port capable of receiving data stored on a data storage medium, e.g. a CD ROM, floppy disk, ribbon tape or the like. The term "computer platform" encompasses the main data processing and storage facility of a computer entity.

Figure 2:
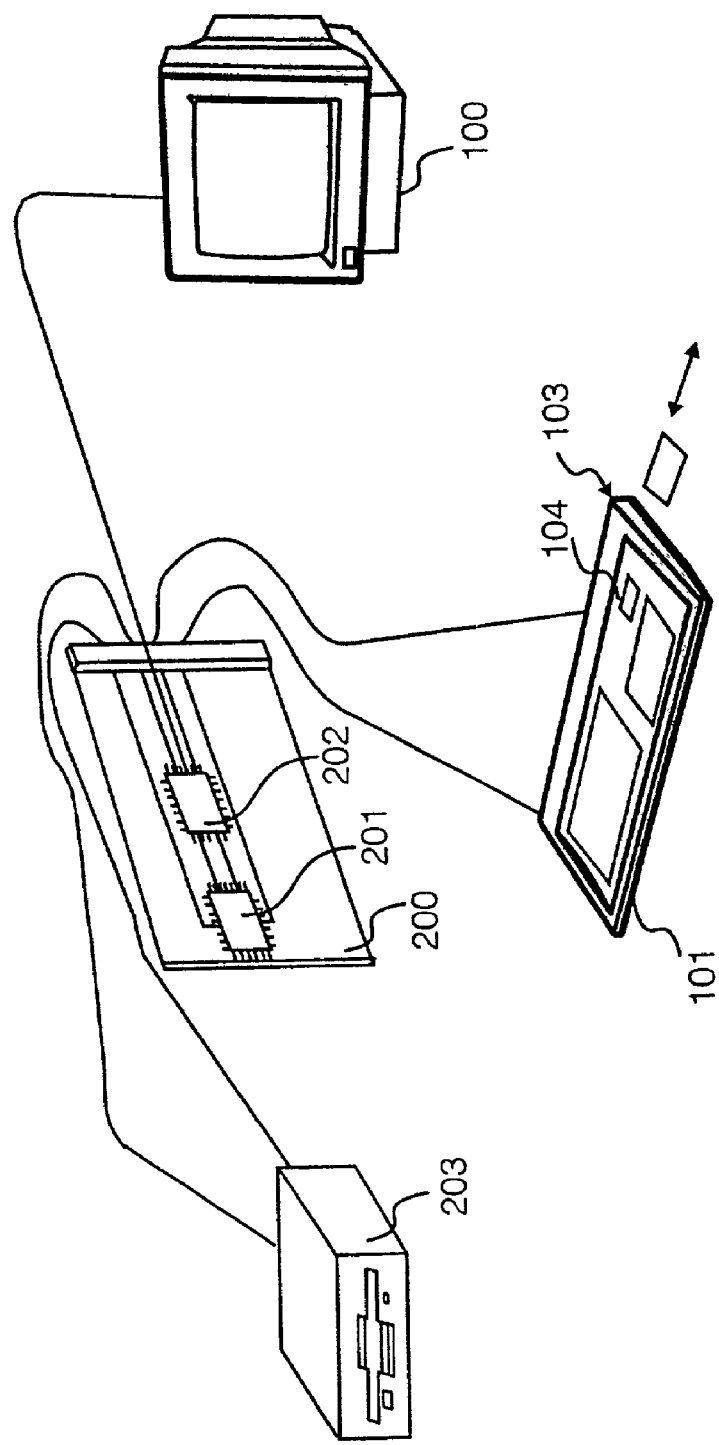
FIG. 2 illustrates schematically connectivity of selected components of the computer entity of FIG. 1.
Figure 3:
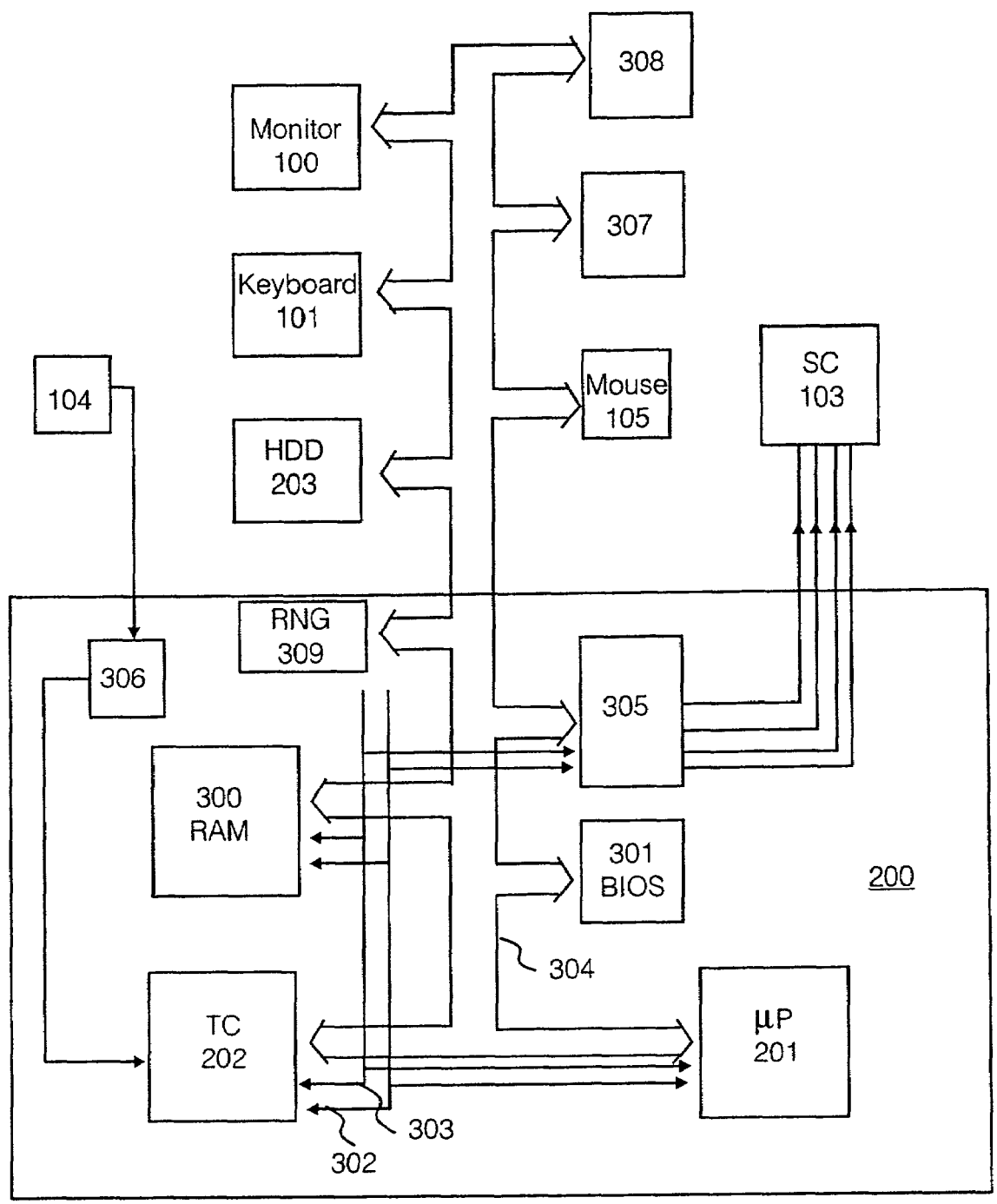
FIG. 3 illustrates schematically a hardware architecture of components of the computer entity of FIG. 1.

Referring to FIG. 1 herein, there is illustrated schematically one example of a computer entity according to a specific implementation of the present invention. Referring to FIG. 2 of the accompanying drawings, there is illustrated schematically physical connectivity of some of the components of the trusted computer entity of FIG. 1. Referring to FIG. 3 herein, there is illustrated schematically an architecture of the trusted computer entity of FIGS. 1 and 2, showing physical connectivity of components of the entity.

In general, in the best mode described herein, a trusted computer entity comprises a computer platform consisting of a first data processor, and a first memory means, together with a trusted component which verifies the integrity and correct functioning of the computing platform. The trusted component comprises a second data processor and a second memory means, which are physically and logically distinct from the first data processor and first memory means.

In the example shown in FIGS. 1 to 3 herein, the trusted computer entity is shown in the form of a personal computer suitable for domestic use or business use. However, it will be understood by those skilled in the art that that this is just one specific embodiment of the invention, and other embodiments of the invention may take the form of a palmtop computer, a laptop computer, a server-type computer, a mobile phone-type computer, or the like and the invention is limited only by the scope of the claims herein. In the best mode example described herein, the computer entity comprises a display monitor 100; a keyboard data entry means 101; a casing 102 comprising a motherboard on which is mounted a data processor; one or more data storage means e.g. hard disk drives; a dynamic random access memory; various input and output ports (not illustrated in FIG. 1); a smart card reader 103 for accepting a user's smart card; a confirmation key 104, which a user can activate when confirming a transaction via the trusted computer entity; and a pointing device, e.g. a mouse or trackball device 105; and a trusted component.

Referring to FIG. 2 herein, there are illustrated some of the components comprising the trusted computer entity, including keyboard 101, which incorporates confirmation key 104 and smart card reader 103; a main motherboard 200 on which is mounted first data processor 201 and trusted component 202, an example of a hard disc drive 203, and monitor 100. Additional components of the trusted computer entity, include an internal frame to the casing 102, housing one or more local area network (LAN) ports, one or more modem ports, one or more power supplies, cooling fans and the like (not shown in FIG. 2).

In the best mode herein, as illustrated in FIG. 3 herein, main motherboard 200 is manufactured comprising a first data processor 201; and preferably a permanently fixed trusted component 202; a local memory device 300 to the first data processor, the local memory device being a fast access memory area, e.g. a random access memory; a BIOS memory area 301; smart card interface 305; a plurality of control lines 302; a plurality of address lines 303; a confirmation key interface 306; and a data bus 304 connecting the processor 201, trusted component 202, memory area 300, a BIOS memory component 301 and smart card interface 305. A hardware random number generator RNG 309 is also able to communicate with the processor 201 using the bus 304.

External to the motherboard and connected thereto by data bus 304 are provided the one or more hard disk drive memory devices 203, keyboard data entry device 101, pointing device 105, e.g. a mouse, trackball device or the like; monitor device 100; smart card reader device 103 for accepting a smart card device as described previously; the disk drive(s), keyboard, monitor, and pointing device being able to communicate with processor 201 via said data bus 304; and one or more peripheral devices 307, 308, for example a modem, printer scanner or other known peripheral device.

To provide enhanced security confirmation key switch 104 is hard wired directly to confirmation key interface 306 on motherboard 200, which provides a direct signal input to trusted component 202 when confirmation key 104 is activated by a user such that a user activating the confirmation key sends a signal directly to the trusted component, bypassing the first data processor and first memory means of the computer platform.

In one embodiment the confirmation key may comprise a simple switch. Confirmation key 104, and confirmation key driver 306 provide a protected communication path (PCP) between a user and the trusted component, which cannot be interfered with by processor 201, which by-passes data bus 304 and which is physically and logically unconnected to memory area 300 or hard disk drive memory device(s) 203.

Trusted component 202 is positioned logically and physically between monitor 100 and processor 201 of the computing platform, so that the trusted component 202 has direct control over the views displayed on monitor 100 which cannot be interfered with by processor 201.

The trusted component lends its identity and trusted processes to the computer platform and the trusted component has those properties by virtue of its tamper-resistance, resistance to forgery, and resistance to counterfeiting. Only selected entities with appropriate authentication mechanisms are able to influence the processes running inside the trusted component. Neither a user of the trusted computer entity, nor anyone or any entity connected via a network to the computer entity may access or interfere with the processes running inside the trusted component. The trusted component has the property of being "inviolate".

Smart card reader 103 is wired directly to smart card interface 305 on the motherboard and does not connect directly to data bus 304. Alternatively, smart card reader 103 may be connected directly to data bus 304. On each individual smart card may be stored a corresponding respective image data which is different for each smart card. For user interactions with the trusted component, e.g. for a dialogue box monitor display generated by the trusted component, the trusted component takes the image data from the users smart card, and uses this as a background to the dialogue box displayed on the monitor 100. Thus, the user has confidence that the dialogue box displayed on the monitor 100 is generated by the trusted component. The image data is preferably easily recognizable by a human being in a manner such that any forgeries would be immediately apparent visually to a user. For example, the image data may comprise a photograph of a user. The image data on the smart card may be unique to a person using the smart card.

Figure 4:
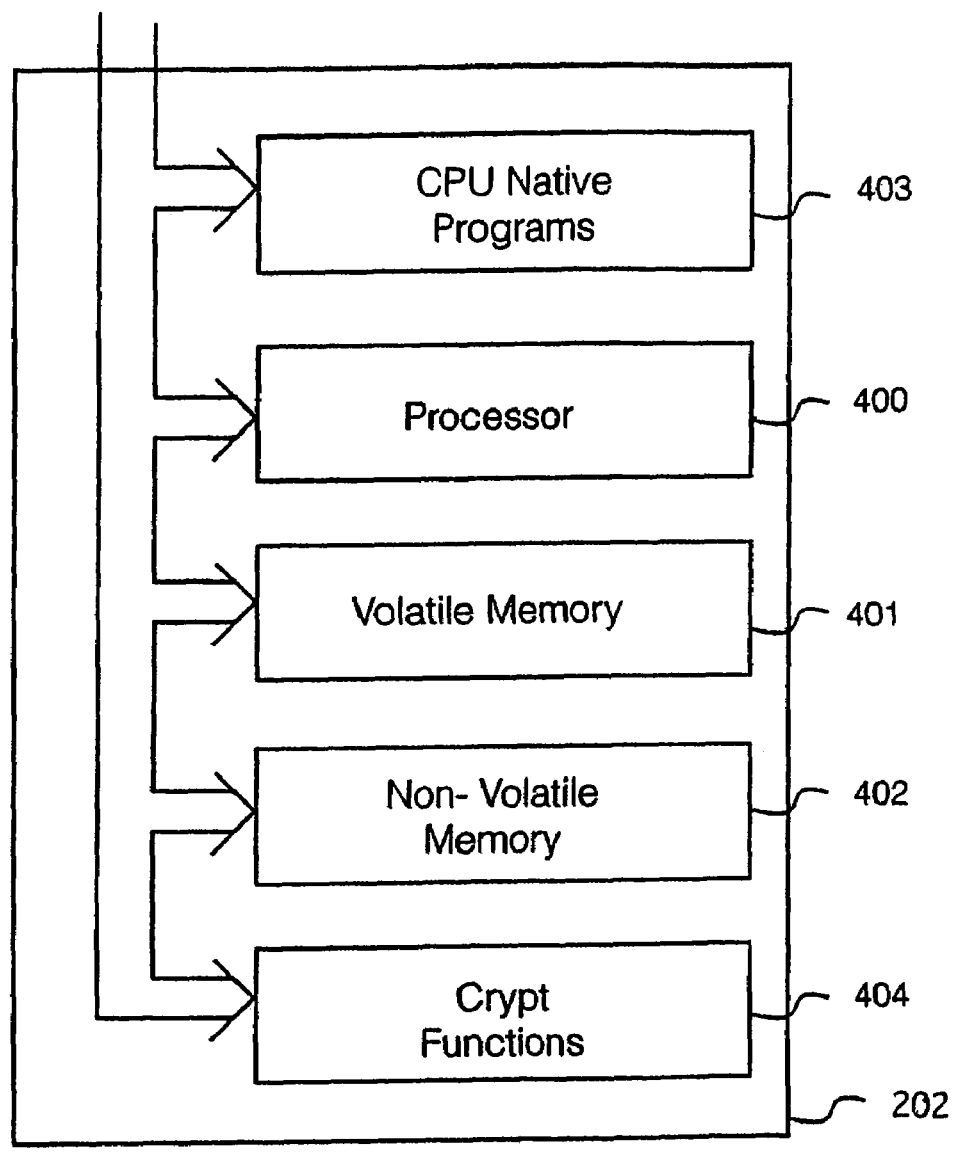
FIG. 4 illustrates schematically an architecture of a trusted component comprising the computer entity of FIG. 1.

Referring to FIG. 4 herein, there is illustrated schematically an internal architecture of trusted component 202. The trusted component comprises a processor 400, a volatile memory area 401; a non-volatile memory area 402; a memory area storing native code 403; and a memory area storing one or a plurality of cryptographic functions, 404, the non-volatile memory 402, native code memory 403 and cryptographic memory 404 collectively comprising the second memory means herein before referred to.

Trusted component 202 comprises a physically and logically independent computing entity from the computer platform. In the best mode herein, the trusted component shares a motherboard with the computer platform so that the trusted component is physically linked to the computer platform. In the best mode, the trusted component is physically distinct from the computer platform, that is to say it does not exist solely as a sub-functionality of the data processor and memory means comprising the computer platform, but exists separately as a separate physical data processor 400 and separate physical memory area 401, 402, 403, 404. By providing a physically present trusted component separate from a main processor of the computer entity, the trusted component becomes harder to mimic or forge through software introduced onto the computer platform. Another benefit which arises from the trusted component being physical, separate from the main processor of the platform, and tamper resistant is that the trusted component cannot be physically subverted by a local user, and cannot be logically subverted by either a local user or a remote entity. Programs within the trusted component are pre-loaded at manufacture of the trusted component in a secure environment. The programs cannot be changed by users, but may be configured by users, if the programs are written to permit such configuration. The physicality of the trusted component, and the fact that the trusted component is not configurable by the user enables the user to have confidence in the inherent integrity of the trusted component, and therefore a high degree of "trust" in the operation and presence of the trusted component on the computer platform.

Figure 5:
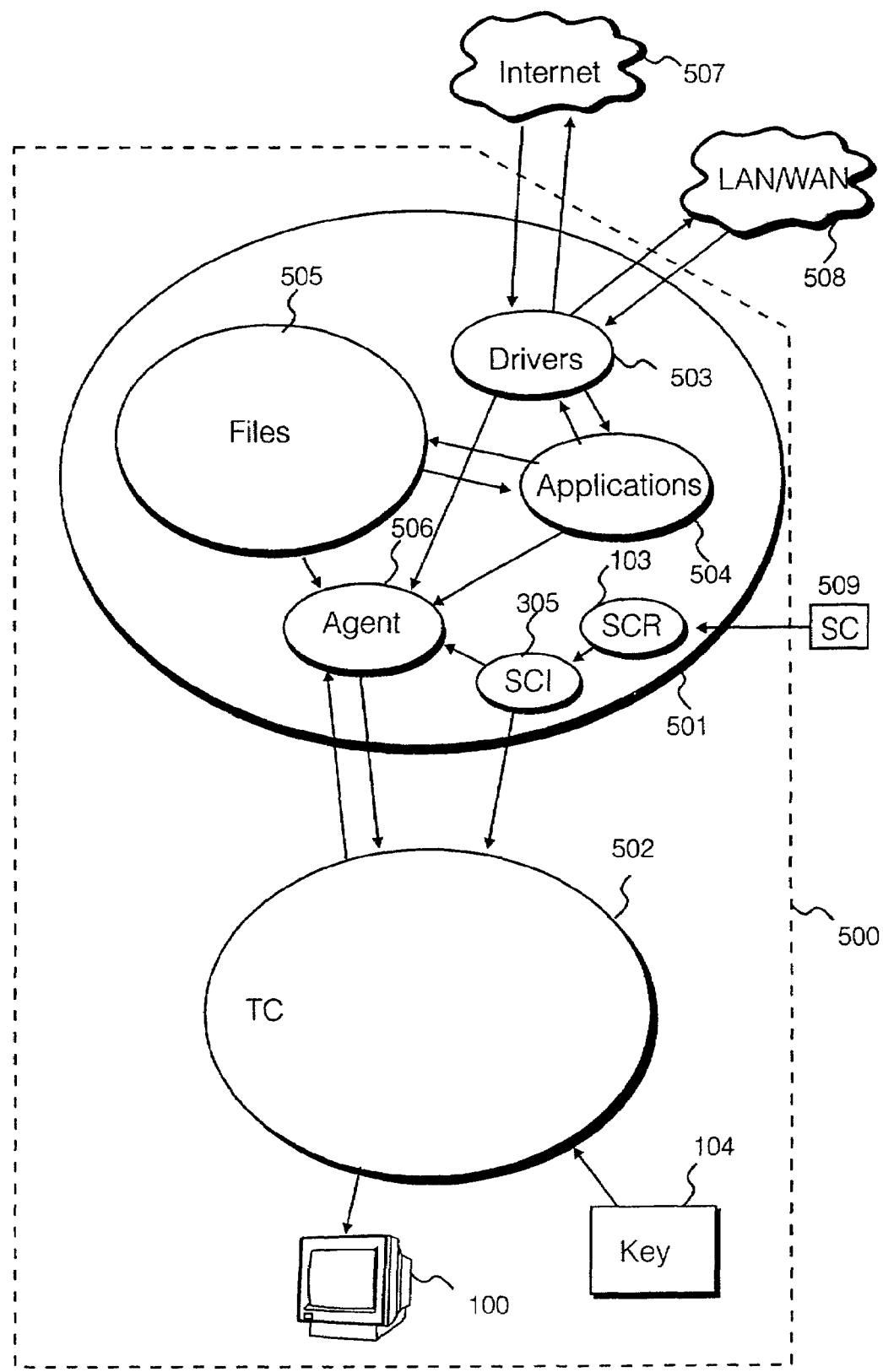
FIG. 5 illustrates schematically a logical architecture of the computer entity, divided into a monitored user space resident on a computer platform and a trusted space resident on the trusted component.

Referring to FIG. 5 herein, there is illustrated schematically a logical architecture of the computer entity 500. The logical architecture has a same basic division between the computer platform, and the trusted component, as is present with the physical architecture described in FIGS. 1 to 3 herein. That is to say, the trusted component is logically distinct from the computer platform to which it is physically related. The computer entity comprises a user space 501 being a logical space which is physically resident on the computer platform (the first processor and first data storage means) and a trusted component space 502 being a logical space which is physically resident on the trusted component 202. In the user space 501 are one or a plurality of drivers 503, one or a plurality of applications programs 504, a file storage area 505; smart card reader 103; smart card interface 305; and a software agent 506 which operates to perform operations in the user space and report back to trusted component 202. The trusted component space is a logical area based upon and physically resident in the trusted component, supported by the second data processor and second memory area of the trusted component. Confirmation key device 104 inputs directly to the trusted component space 502, and monitor 100 receives images directly from the trusted component space 502. External to the computer entity are external communications networks e.g. the Internet 507, and various local area networks, wide area networks 508 which are connected to the user space via the drivers 503 which may include one or more modem ports. External user smart card 509 inputs into smart card reader 103 in the user space.

In the trusted component space, are resident the trusted component itself, displays generated by the trusted component on monitor 100; and confirmation key 104, inputting a confirmation signal via confirmation key interface 306.

In the best mode for carrying out the invention, the computing entity has a plurality of modes of operation, referred to herein as operating states. Different ones of the plurality of operating states allow the computing entity to perform different sets of tasks and functionality. In some of the individual states, complex operations can be carried out with a large number of degrees of freedom, and complexity.

In other operating states, there are more restrictions on the behavior of the computing entity.

The level of 'trust' which can be placed on the computing entity when operating in each of the plurality of different states is related to:

- The number of different operations which can be carried out in a particular state
- The complexity of operations which can be carried out in a particular state.
- A number of other states into which the computing entity can move from the particular state, without re-booting the computing entity.
- A number of different states from which the particular state can be arrived at, without re-booting the computing entity.
- The connectivity of the computing entity when in the particular state, that is to say, how many other computing entities or devices the entity is connectable to, e.g. over the internet, a wide area network, or a local area network.
- Restrictions on input of data from an external source, e.g. another computing entity, a floppy disk, a CD ROM, a modem, a LAN port, or the like.
- Restrictions on output of data from the particular state to other computing entities, e.g. whether data can be saved to a CD writer, floppy disc drive, or exported through an interface to a further computer entity over the internet, a local area network, or a wide area network.
- An amount of, and a reliability of, internal monitoring processes within the computer entity which occur in the particular state; that is to say, the amount and reliability of a set of metrics applied by the trusted component when in that state.
- A number of checks which need to be made before a user can enter the particular state.
- A difficulty of bypassing one or a plurality of checks which need to be made before a user can enter the particular state.
- A difficulty of overcoming, without bypassing, one or a plurality of checks which are made before a user of the computer entity can enter the computing entity into the particular state.

The trust placed in the computer entity is composed of two separate parts;

- The trust placed in the trusted component itself.
- The certainty with which the trusted component can verify operation of the computer entity.

As described herein, levels or degrees of trust placed in the computer entity are determined as being relative to a level of trust which is placed in the trusted component. Although the amount of trust in a computer entity is related to many factors, a key factor in measuring that trust are the types, extent and regularity of integrity metric checks which the trusted component itself carries out on the computer entity.

The trusted component is implicitly trusted. The trusted component is embedded as the root of any trust which is placed in the computing platform and the computing platform as a whole cannot be any more trusted than the amount of trust placed in the trusted component.

By virtue of the trusted component monitoring operations of the computer platform, the trust placed in the trusted component can be extended to various parts of the computer platform, with the level and extent of trust placed in individual areas of the computer platform, being dependent upon the level and reliability with which the trusted component can monitor that particular area of the computing platform.

Since the trusted areas of the computing platform are dependent upon the frequency, extent, and thoroughness with which the trusted component applies a set of integrity metric measurements to the computer platform, if the trusted component does not comprehensively measure all measurable aspects of the operation of the computing platform at all times, then the level of trust placed in individual parts of the computer platform will form a subset of the overall trust placed in the trusted component itself. If the computing entity supports only a limited number of integrity metrics, a user of the equipment, including a third party computing entity, is restricted in its ability to reason about the level of trust which can be placed in the computing entity.

Although various islands of the computer platform are trusted at various levels, depending upon the integrity metrics which are applied by the trusted component for measuring those areas of the computer platform, the level of trust placed in the computer platform as a whole is not as high as that which is inherent in the trusted component. That is to say, whilst the trusted component space 502 is trusted at a highest level, the user space 501 may comprise several regions of various levels of trust. For example, applications programs 504 may be relatively untrusted. Where a user wishes to use the computer entity for an operation which involves a particularly high degree of confidentiality or secrecy, for example working on a new business proposal, setting pay scales for employees or equally sensitive operations, then the human user may become worried about entering such details onto the computer platform because of the risk that the confidentiality or secrecy of the information will become compromised. The confidential information must be stored in the computing entity, and islands of high trust may not extend over the whole computing platform uniformly and with the same degree of trust. For example, it may be easier for an intruder to access particular areas or files on the computing platform compared with other areas or files.

Additionally, a user may wish to instruct the trusted component to perform certain functions, this poses the problem that all the commands to instruct the trusted component must pass through the computer platform, which is at a lower level of trust than the trusted component itself. Therefore, there is a risk of the commands to the trusted component becoming compromised during their passage and processing through the computer platform.

According to specific implementations of the present invention, the computer entity may enter a plurality of different states, each state having a corresponding respective level of trust, wherein the individual levels of trust corresponding to different states may be different from each other.

Figure 6:
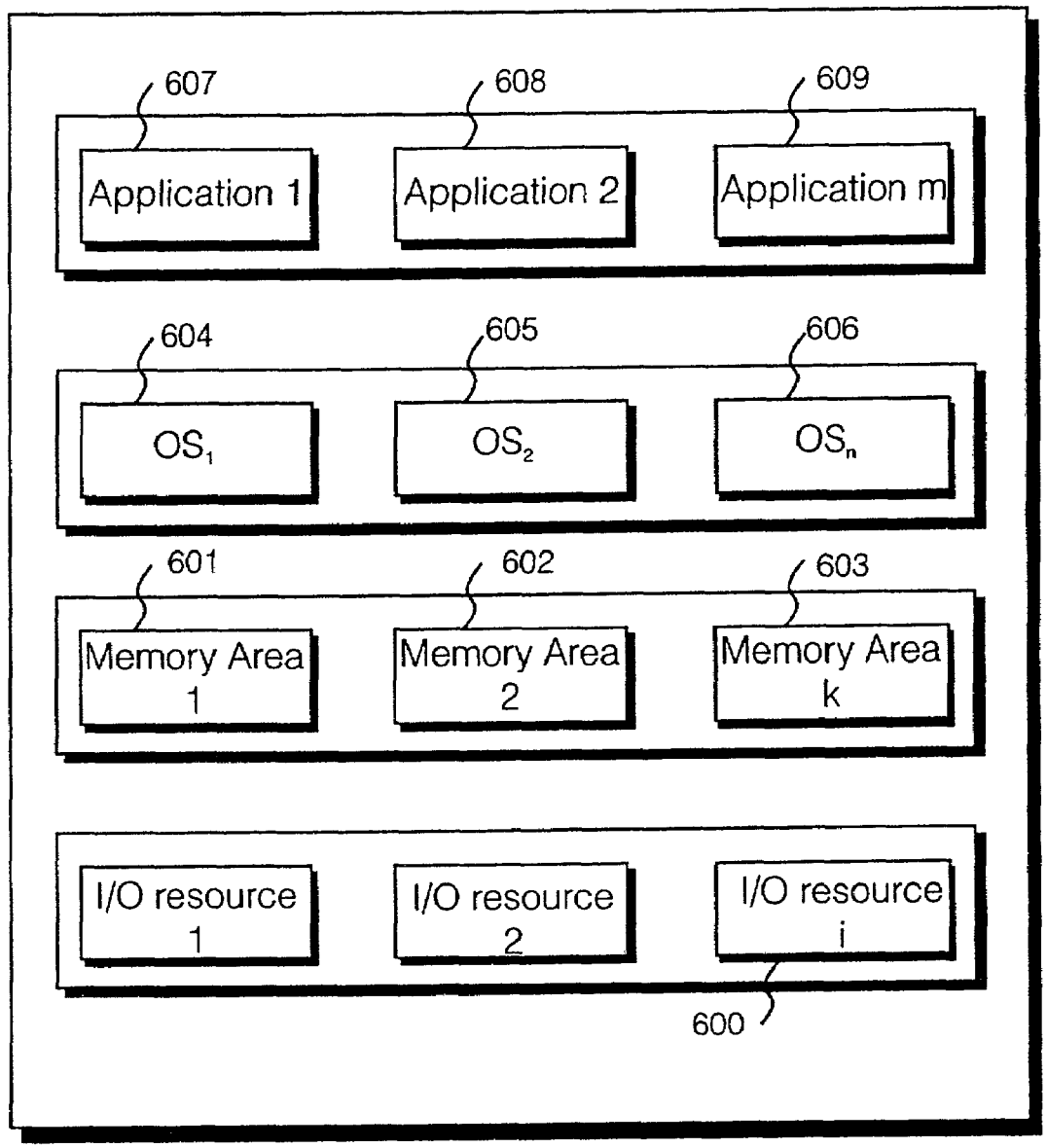
FIG. 6 illustrates schematically a set of physical and logical resources comprising the computer entity, wherein different combinations of usage and accessibility to the individual physical and logical resources corresponds with operation in different states of the computing entity.

Referring to FIG. 6, there is illustrated schematically a set of physical and logical resources available to the computing entity. In the general case, the computing entity comprises a plurality of input/output devices 600 for communicating with other computing entities, examples of such devices including a modem, a local area network port, an Ethernet card, a hard disk drive 203, a floppy disk drive, and a smart card reader device 103; a plurality of memory areas 601-603, resident on the hard disk 203, or ram 300; one or a plurality of operating systems 604-606; and one or a plurality of application programs 607-609.

In this specification, by the term "state" when used in relation to a computing entity, it is meant a mode of operation of the computing entity in which a plurality of functions provided by the computing platform may be carried out. For example in a first state, the computing entity may operate under control of a first operating system, and have access to a first set of application programs, a first set of files, and a first set of communications capabilities, for example modems, disk drives, local area network cards, e.g. Ethernet cards. In a second state, the computing platform may have access to a second operating system, a second set of applications, a second set of data files and a second set of input/output resources. Similarly, for successive third, fourth states up to a total number of states into which the computing entity can be set. There can be overlap between the facilities available between two different states. For example, a first and second state may use a same operating system, whereas a third state may use a different operating system.

Figure 7:
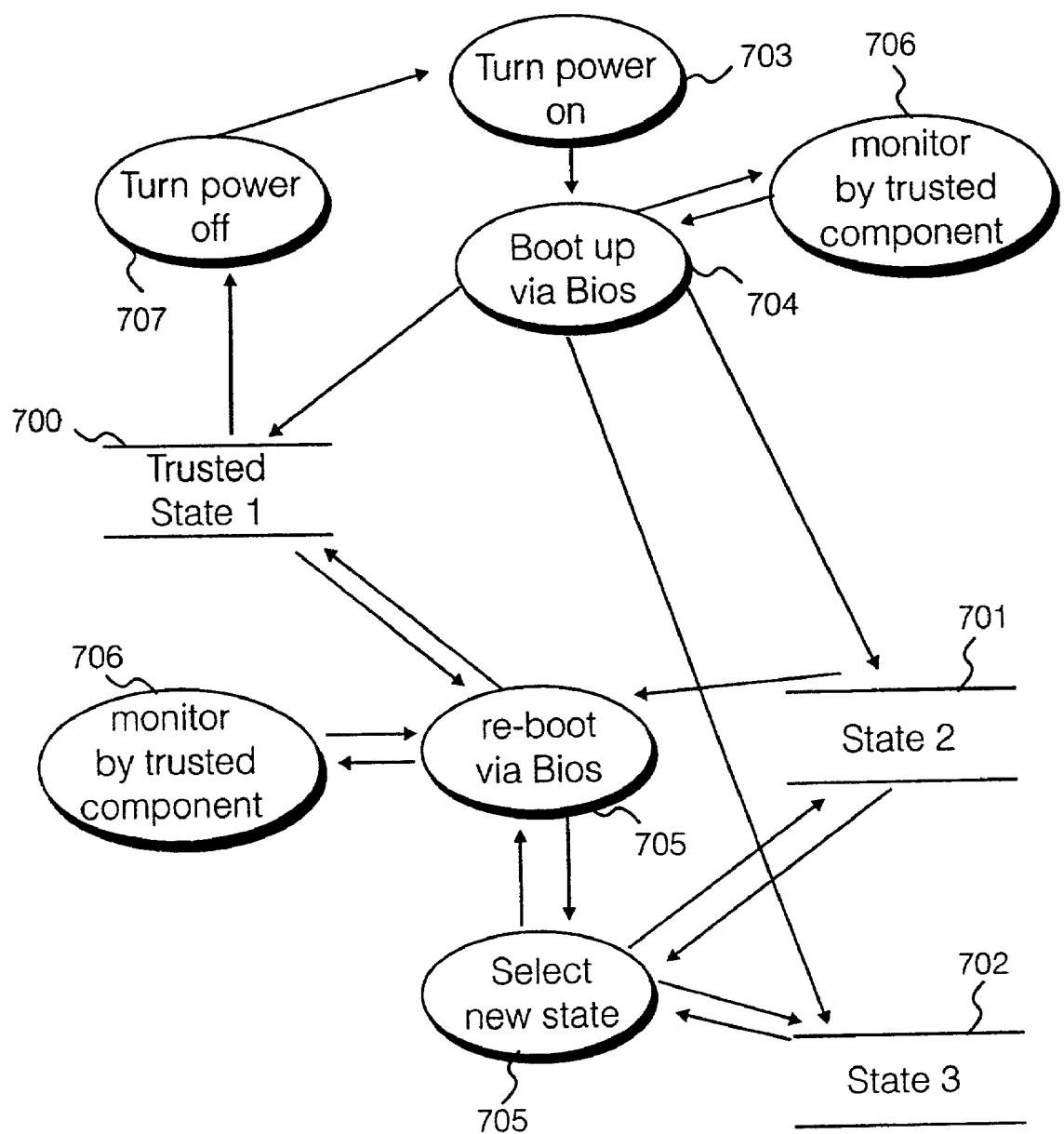
FIG. 7 illustrates schematically an example of a state diagram illustrating a set of states into which the computing entity can be placed, and processes for entry and exit from those states.

Referring to FIG. 7 herein, there is illustrated schematically a state diagram representing a plurality of states into which the computing entity may be placed. In principle, there is no limit to the number of different states which the computing entity may be placed, but in the example shown in FIG. 7 three such states are shown. In the example of FIG. 7, the computing entity may be placed into a first, trusted state 700, a second state 701 being a general purpose untrusted state and a third state 702 being a general purpose untrusted state. In the general case, the computing entity can reside in a plurality of different states, each having a corresponding respective level of trust.

Trusted state 700 is distinguished from the second and third states 701, 702 by virtue of the way in which the trusted state can be accessed. In one option, trusted state 700 can only be accessed by reference to the trusted component 202. However, in the preferred best mode implementation entry into the trusted state need not be controlled by the trusted component. To access the trusted state, a user may turn on the computing entity, that is to say turn on the power supply to the computing entity in a turn on process 703. Upon turning on the power supply, the computing entity boots up via the BIOS file 301 in process 704, from a routine contained in the computer BIOS. The computing entity may enter either the trusted state 700, the second state 701, or the third state 702, depending upon how the BIOS file is configured. In the best mode herein, a user of the computer entity has the option, provided as a menu display option on monitor 100 during boot up of the computer entity, or as a selectable option presented as a screen icon, when in any state, to enter either the trusted state 700, or one of the other states 701, 702 by selection. For example on turn on, the BIOS may be configured to default boot up in to the second state 701. Once in the second state, entry into a different state 700 may require a key input from a user, which may involve entry of a password, or confirmation of the users identity by the user entering their smart card into smart card reader 103.

Once the computing entity has entered a state other than the trusted state, e.g. the second state 701 or third state 702, then from those states the user may be able to navigate to a different state. For example the user may be able to navigate from the second state 701 to the third state 702 by normal key stroke entry operations on the keyboard, by viewing the monitor and using a pointing device signal input, usually with reference back to the BIOS. This is shown schematically as select new state process 705.

In order to enter the trusted state 700, the computer entity must be either booted up for the first time after turn on process 704, or re-booted via the BIOS in re-boot process 706. Re-boot process 706 is very similar to boot up process 704 except that it can be entered without having to turn the power of the computing entity off and then on again. To leave the trusted state 700, the computing entity must again refer to the BIOS 704 which involves automatic monitoring by the trusted component 202 in monitor process 706. Similarly, re-booting via the BIOS in process 705 involves automatic monitoring by the trusted component in monitoring process 706.

To leave the trusted state 700, the trusted state can only be left either by turning the power off in power down process 707, or by re-booting the computing entity in re-boot process 705. Re-booting the BIOS in re-boot process 705 involves automatic monitoring by the trusted component 706. Once the trusted state is left, it is not possible to re-enter the trusted state without either re-booting the computing entity, in re-boot process 705, or booting up the computing entity after a power down in process 704, both of which involve automatic monitoring by the trusted component in monitoring process 706.

Figure 8:
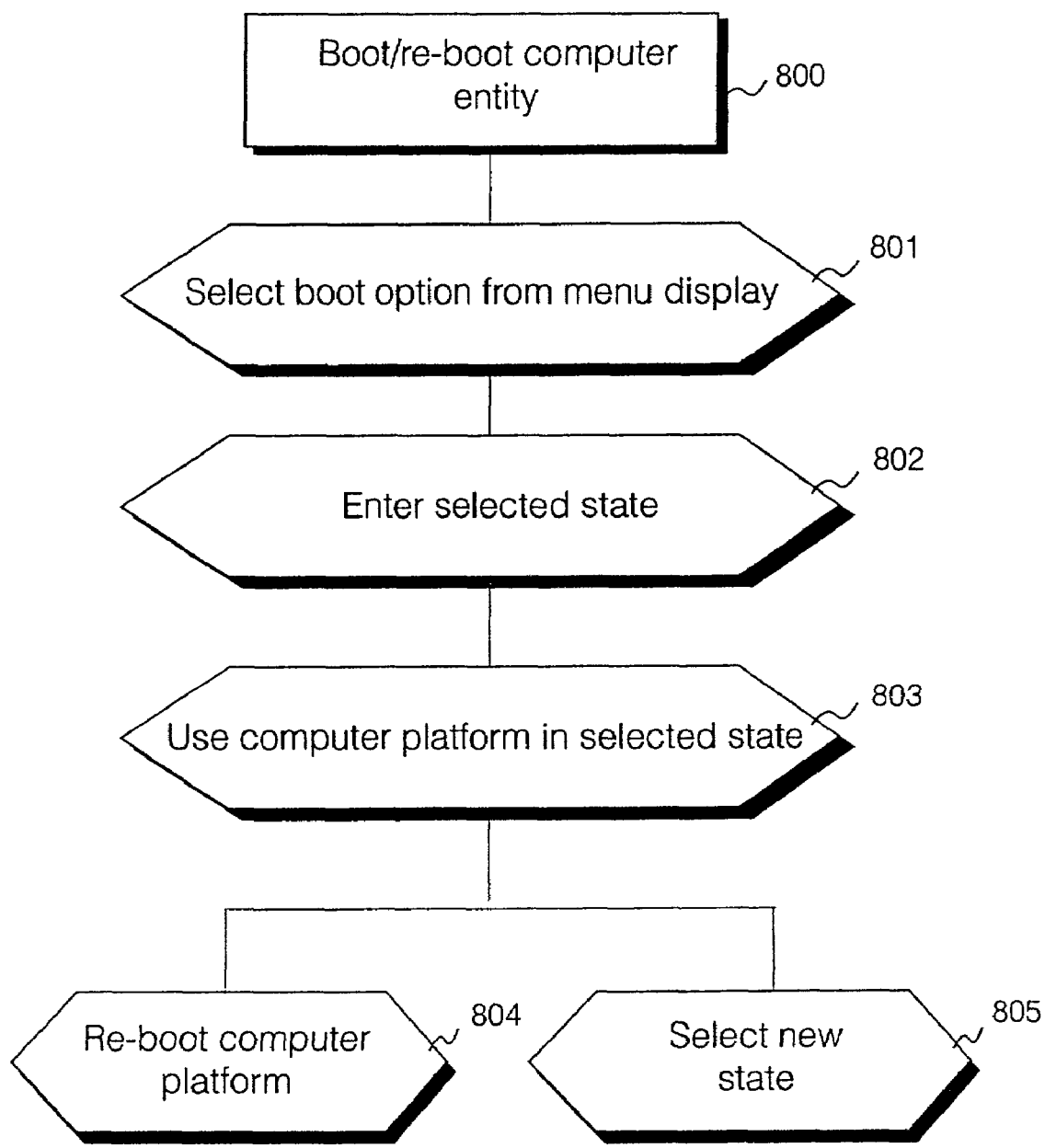
FIG. 8 illustrates schematically a use model followed by a user of the computing entity for entry and exit from individual states of the computing entity.

Referring to FIG. 8, herein, there is illustrated schematically a use model followed by a user of the computer entity navigating through one or more states. In step 800, after turning on a power supply to the computing entity, the computer boots up via the BIOS program. The boot process is very similar to re-booting the computer from an existing state. In each case, control of microprocessor 201 is seized by the BIOS component 301. The trusted component 202 measures a set of integrity metric signals from the BIOS 301, to determine a status of the BIOS 301. In step 801, the graphical user interface displays a menu option for entry into a plurality of different states. One of the states displayed on the menu is a trusted state as described herein before. The user manually selects a state in which to enter by using the keyboard or pointing device of the graphical user interface, for example by clicking a pointer icon over a state icon displayed on the graphical user interface. Alternatively, an automatic selection of a state may be made by a smartcard or via a network connection from state selection options generated by the BIOS. After selection of a state, the BIOS loads a program which loads a selected operating system corresponding with the state. A different load program is used for each of the plurality of different possible states. The trusted component measures that program in broadly a similar way to the way in which it measures the BIOS, so that the trusted component can record and determine which state has been loaded. When an external entity requests that the trusted component supplies integrity metrics, the trusted component supplies both the BIOS metrics and the loaded program metrics. In step 802, the computing entity enters the selected state. Once in the selected state, in step 803 the user has access to a set of physical and logical resources in that state. For example, in a relatively insecure state, the user may have full internet access through a modem device comprising the computing entity, may have full access to one or a plurality of hard disk drives or CD readers/writers, and may have full access to a floppy disk drive, as well as having access to a plurality of pre-loaded commercially available applications programs. On the other hand, if the user selects a trusted state having a relatively high level of trust, in that state the user may have available a single operating system, a limited set of applications, for example a word processor, accounts package, or data base, and use of a printer device, but in that state, use of a hard disk drive, a floppy disk drive, or the internet may be restricted. Each selection of a separate state into which the computer may be booted may be pre-configured by configuration of the BIOS component 301. A choice of states is presented by the BIOS to a user. Once a state is selected, the BIOS cause the selected state to load by calling up an operating system loading program to load that state. The states themselves are pre-configured by the loading and the relevant operating system. For entry into trusted states, entry into those states is via operation of the BIOS component 301, and including monitoring by the trusted component in monitoring process 706. In order to enter a trusted state, a user must boot or e-boot the computer platform in step 804. Similarly, to exit from a trusted state, the user must also boot or re-boot the computing entity in step 804. To navigate from a state having a lower trust level, for example the second state (701), or the third state (702), the user may navigate from that state to another state in step 805, which, in the best mode involves re-booting of the computing entity via the BIOS.

Figure 9:
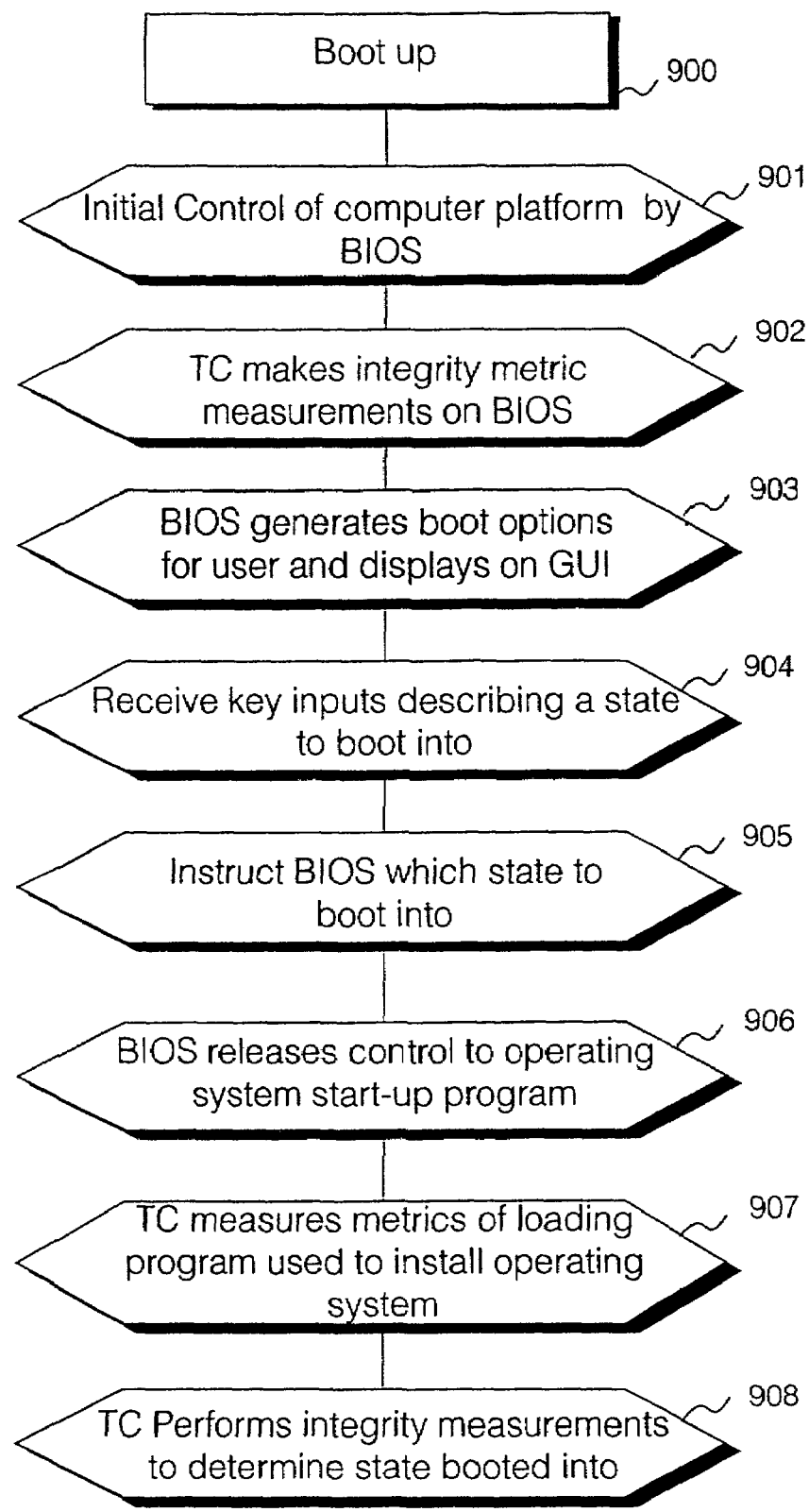
FIG. 9 illustrates schematically steps of a process for entry into a trusted state.

Referring to FIG. 9 herein there is illustrated schematically process steps carried out by the computing entity for entering a state via boot process 704 or re-boot process 705.

In step 900, the computer enters a boot up routine, either as a result of a power supply to the computing entity being turned on, or as a result of a user inputting a reset instruction signal, for example by clicking a pointer icon over a reset icon displayed on the graphical user interface, giving rise to a reset signal. The reset signal is received by the trusted component, which monitors internal bus 304. The BIOS component 301 initiates a boot-up process of the computer platform in step 901. Trusted component 202 proceeds to make a plurality of integrity checks on the computer platform and in particular checks the BIOS component 301 in order to check the status of the computer platform. Integrity checks are made by reading a digest of the BIOS component. The trusted component 202 acts to monitor the status of the BIOS, and can report to third party entities on the status of the BIOS, thereby enabling third party entities to determine a level of trust which they may allocate to the computing entity.

There are several ways to implement integrity metric measurement of the BIOS. In each case, the trusted component is able to obtain a digest of a BIOS file very early on in the boot up process of the computer platform. The following are examples:

The BIOS component may be provided as part of the trusted component 202, in which the architecture illustrated in FIG. 3 herein is modified such that BIOS 301 resides within trusted component 202.

The first processor 201 of the computer platform may execute immediately after reset, an internal firmware component which computes a digest over a preset memory space occupied by a BIOS file. The first processor writes the digest to a preset memory space to which only the firmware component is able to write to that memory space. The first processor reads from the BIOS file in order to boot the computer platform. At any time afterwards, the trusted component reads data from a preset location within the memory space to obtain a BIOS digest data.

The trusted component may be addressed at a memory location occupied by BIOS 301, so that the trusted component contains a set of first native instructions which are accessed after reset of the first processor 201. These instructions cause the first processor 201 of the computer platform to calculate a digest of the BIOS, and store it in the trusted component. The trusted component then passes control to the BIOS 301 once the digest of the BIOS is stored in the trusted component.

The trusted component may monitor a memory control line and a reset line and verify that the BIOS component 301 is the first memory location accessed after the computer platform resets. At some stage in the boot process, the BIOS passes control to the trusted component and the trusted component causes the first processor of the computer platform to compute a digest of the BIOS and return the digest to the trusted component. The process of computing the digest and writing the result to the trusted component must be atomic. This action may be started by the trusted component, causing the computer platform's processor to read a set of native instructions from the trusted component which causes the processor to compute a digest over a memory space occupied by the BIOS, and to write the digest data to the memory space occupied by the trusted component. Alternatively, this action could be started by the trusted component causing the first processor of a platform to execute an instruction, where the processor computes a digest over a preset memory space occupied by the BIOS and writes the digest to a preset memory space occupied by the trusted component.

A loading program for loading a selected operating system is itself loaded by the BIOS program. Integrity metrics of the operating system loading program are also measured by computing a digest of the loading program.

In one embodiment, trusted component 202 may interrogate individual components of the computer platform, in particular hard disk drive 203, microprocessor 201, and RAM 301, to obtain data signals directly from those individual components which describe the status and condition of those components. Trusted component 202 may compare the metric signals received from the plurality of components of the computer entity with the pre-recorded metric data stored in a memory area reserved for access by the trusted components. Provided that the signals received from the components of the computer platform coincide with and match those of the metric data stored within the memory, then the trusted component 202 provides an output signal confirming that the computer platform is operating correctly. Third parties, for example, other computing entities communicating with the computing entity may take the output signal as confirmation that the computing entity is operating correctly, that is to say is trusted.

In step 903 BIOS generates a menu display on monitor 100 offering a user a choice of state options, including a trusted state 700. The user enters details of which state is to be entered by making key entry to the graphical user interface or data entry using a pointing device, e.g. mouse 105. The BIOS receives key inputs from a user which instruct a state in to which to boot in step 904. The trusted component may also require a separate input from confirmation key 104 requiring physical activation by a human user, which bypasses internal bus 304 of the computer entity and accesses trusted component 202 directly, in addition to the user key inputs selecting the state. Once the BIOS 301 has received the necessary key inputs instructing which state is required, the processing of the set of configuration instructions stored in BIOS 301 occurs by microprocessor 201, and instructs which one of a set of state options stored in the BIOS file, the computer platform will configure itself into. Each of a plurality of state selections into which the computer platform may boot may be stored as separate boot options within BIOS 301, with selection of the boot option being controlled in response to keystroke inputs or other graphical user inputs made by a user of the computing entity.

Once the correct routine of BIOS file 301 is selected by the user, then in step 906, the BIOS file then releases control to an operating system load program stored in a memory area of the computer platform, which activates boot up of the computer platform into an operating system of the selected state. The operating system load program contains a plurality of start up routines for initiating a state, which include routines for starting up a particular operating system corresponding to a selected state. The operating load program boots up the computer platform into the selected state. The operating system measures the metrics of the load program which is used to install the operating system, in step 907. Once in the selected state, trusted component 202 continues, in step 908, to perform on an ongoing continuous basis further integrity check measurements to monitor the selected state continuously, looking for discrepancies, faults, and variations from the normal expected operation of the computer platform within that state. Such integrity measurements are made by trusted component 202 sending out interrogation signals to individual components of the computer platform, and receiving response signals from the individual components of the computer platform, which response signals the trusted component may compare with a predetermined preloaded set of expected response signals corresponding to those particular states which are stored within the memory of the trusted component, or the trusted component 202 compares is the integrity metrics measured from the computer platform in the selected state with the set of integrity metrics initially measured as soon as the computer platform enters the selected state, so that on an ongoing basis any changes to the integrity metrics from those initially recorded can be detected.

During the boot up procedure, although the trusted component monitors the boot up process carried out by the BIOS component, it does not necessarily control the boot up process. The trusted component acquires a value of the digest of the BIOS component 301 at an early stage in the boot up procedure. In some of the alternative embodiments, this may involve the trusted component seizing control of the computer platform before boot up by the BIOS component commences. However, in alternative variations of the best mode implementation described herein, it is not necessary for the trusted component to obtain control of the boot up process, but the trusted component does monitor a computer platform, and in particular the BIOS component 301. By monitoring the computer platform, the trusted component stores data which describes which BIOS options have been used to boot up the computer, and which operating system has been selected. The trusted component also monitors the loading program used to install the operating system.

There will now be described an example of operation of a computer entity within a trusted state in a first specific mode of operation according to the present invention.

Figure 10:
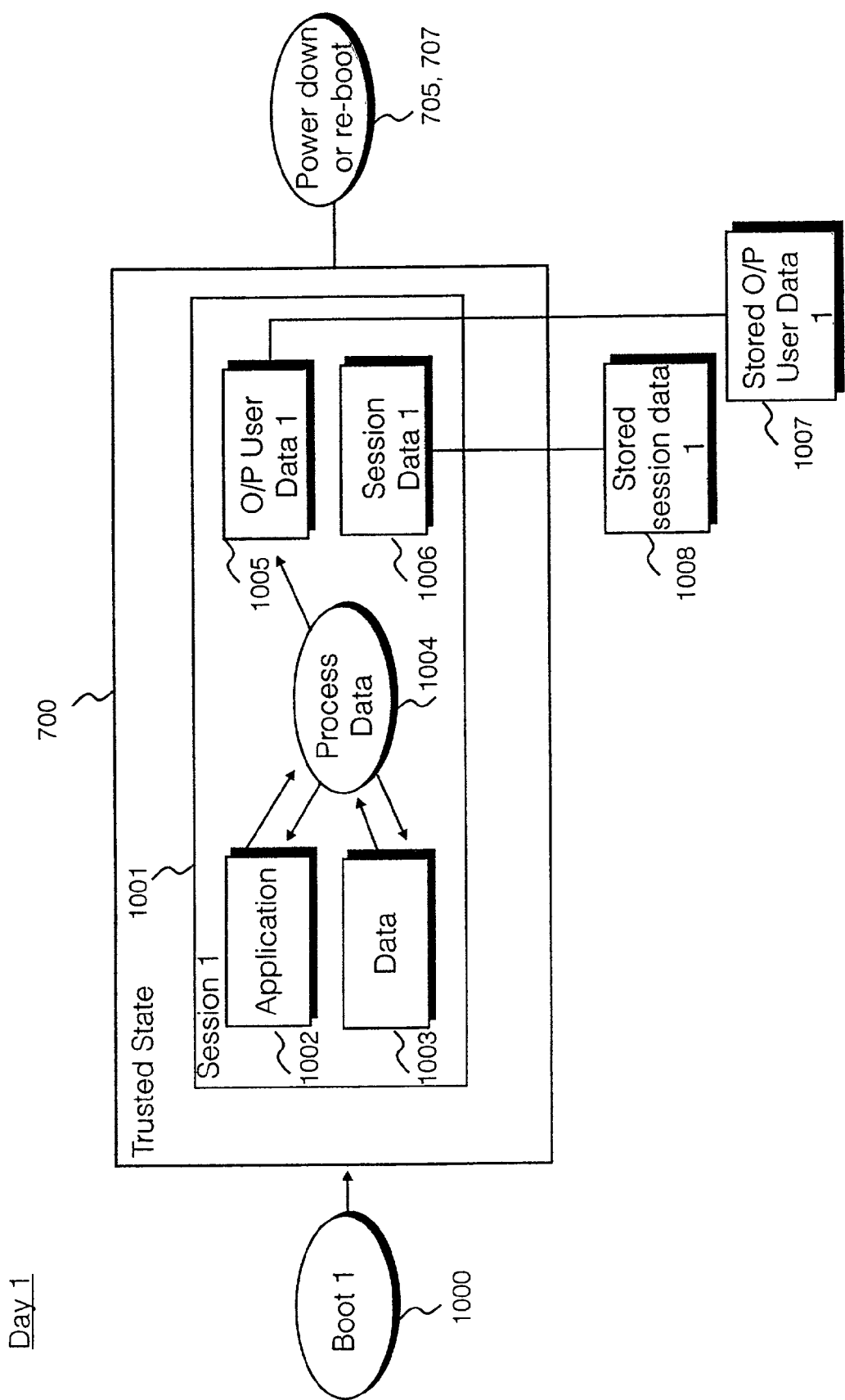
FIG. 10 illustrates schematically a first mode of operation of the computing entity in a trusted state, in which a first session is carried out by a user.
Figure 11:
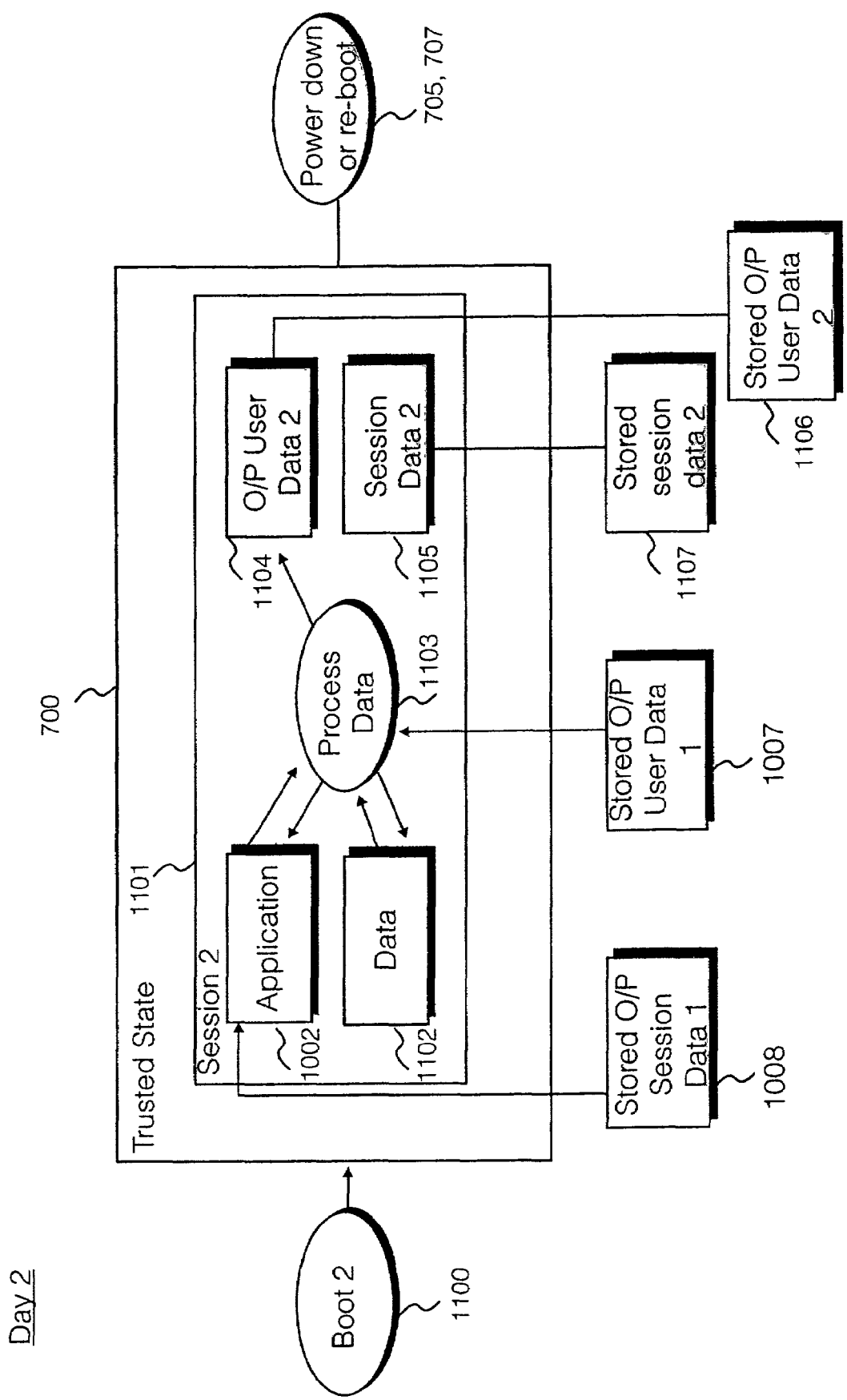
FIG. 11 illustrates schematically a second session carried out in a trusted state, wherein the second session is carried out after closure of the first session.

Referring to FIGS. 10 and 11 herein, there is illustrated schematically usage of the computing entity in a trusted state, extending over a plurality of user sessions, for example usage of the computing entity over two successive days, whilst turning off or re-booting the computing entity between sessions.

Referring to FIG. 10 herein, a user boots up the computing entity into a trusted state 700 as herein before described in a first boot process 1000. In the trusted state, the user commences a first session 1001 of usage of the computing entity. Within the session, because the computer platform is booted into the trusted state, a predetermined set of logical and physical resources are available to the user within that trusted state. Typically, this would include access to an operating system and a predetermined selection of applications. The level of trust which applies to the trusted state varies depending upon the number, complexity and reliability or the physical and logical resources available to the user within the trusted state. For example, where the trusted state is configured to use a well-known reliable operating system, for example UNIX, and a reliable word processing package with minimal access to peripheral devices of the computer platform being permitted in the trusted state, for example no access to modems, and access to output data restricted to a single writer drive, e.g. a CD writer, then this may have a relatively high degree of trust. In another trusted state, where more facilities are available, the trust level would be different to that in a trusted state in which more limited access to physical or logical resources. However, each trusted state is characterized in that the access to facilities is predetermined and known and can be verified by trusted component 202. During the first session 1001, a user may call up an application 1002 available in the trusted state, and may enter user data 1003, for example via a keyboard device. The user data 1003 is processed according to the application 1002 in processing operation 1004, resulting in processed output user data 1005. During the course of the session, by virtue of using the computer platform, operating system and applications, the user may have reconfigured the applications and/or operating system for a specific usage within the session. For example, in a word processor application, documents may have been formatted with certain line spacing, font styles etc. To avoid these settings being lost on leaving the trusted state, such settings comprising session data 1006 may be stored during the session. Similarly, to avoid the effort made by the user during the session being lost, the output user data may be stored during the session. However, the user session 1001 only exists in the trusted state as long as the trusted state exists. Therefore, to avoid loss of settings and data from the first session 1001 in the trusted state 700, the output user data and session data must be stored as stored output user data 1007 and stored session data 1008 respectively before the trusted state can be exited. The stored output user data 1007 and stored session data 1008 may be saved to a device available in the trusted state, for example hard disk drive 203 or a CD reader/writer peripheral for use in a further successive session, or be encrypted and signed and then saved at a remote location, accessed over a network. Preferably, signing of user data and session data is done by the trusted component and/or the users smartcard. Exit from the trusted states involves closing the first user session 1001, and rebooting the computing entity via re-boot process 705, or powering down the computing entity via power down process 707. In the first user session in the trusted state, processing of user input data occurs, and the output of the process is the output processed data. The output processed data is stored after processing of the data has terminated, and before the session is ended, and before the trusted state is exited.

Referring to FIG. 11 herein, there is illustrated schematically operation of the computing entity on a second day, in a second session in the same trusted state 700. Between the first and second sessions the trusted state 700 disappears completely, since the computing entity leaves the trusted state 700. On leaving the trusted state 700, apart from the stored output user data and stored session data, the computer platform saves no information concerning the trusted state other than that which is pre-programmed into the BIOS 301 and the loading programs and the trusted component 202. Therefore, for all practical purposes, on power down or re-boot, the trusted state 700 ceases to exist. However, the ability to re-enter the trusted state 700 through a new operation of the boot process or reboot process remains within the capabilities or the computing entity. The trusted state is entered via a second boot process 1100 as herein before described. Once the trusted state is entered, a second session 1101 commences. Within the second session 1101 the operating system, applications and facilities available from the computer platform are selected from the same set of such physical and logical resources as where available previously for the first session. However, usage of those facilities within the second session may vary according to a user's keystroke instructions. Second session 1101 may effectively comprise a continuation of first session 1001. The user may call up the same application 1002 as previously and may effectively continue the work carried out during the first session in the second session 1101. However, because exiting the trusted state involves the computer platform in complete amnesia of all events which occurred during that trusted state, after the state has been left, if the trusted state is reactivated and the new session is commenced, the application 1002 has no memory of its previous configuration. Therefore, stored output session data 1008 produced at the end of the first session 1001 must be input into the second session 1101 in order to reconfigure the application, to save for example the settings of line spacing and format, and the output user data 1005 stored as stored output user data 1007 must be re-input into the second session 1101 for further work to continue on that data. The stored session data 1008 and user data 1007 may be retrieved from a storage medium, decrypted and authenticated and then loaded into the trusted state, to configure the second session as a continuation of the first session. Preferably, integrity measurement checks are performed by the trusted component on the user data and session data imported from the smartcard or storage medium, before that data is loaded. During the second session 1101, further user data 1102 is input by the user, and the further data is processed together with the stored first output data 1007 according to the application 1002 configured according to the first stored output session data 1008 in process 1103. Processing of the data 1103 during the second session 1101 results in a new output user data 1104. If the application or operating system used in the second session has changed in configuration during the second session, this results in a new session data 1105. As with the first session, in order to close the session without losing the settings of the application program, and operating system, and without losing the benefit of the work carried out during the second session, both the new session data 1105 and the new output user data 1104 need to be stored. These data are stored respectively as a stored new output user data 1106 and a stored new session data 1107.

At the end of the second session, the session is closed after having saved the work produced in the second session, and the trusted state is exited via a power down process or re-boot process 705, 707. All memory of the trusted state and second session other than that stored as the session data 1107 and stored output user data 1106 is lost from the computer platform.

It will be appreciated that the above example is a specific example of using a computer in successive first and second sessions on different days. In between use of those sessions, the computing entity may be used in a plurality of different states, for different purposes and different operations, with varying degrees of trust. In operating states which have a lower level of trust, for example the second and third states (being 'untrusted' states) the computer entity will not lose memory of this data configuration between transitions from state to state. According to the above method of operation, the trusted state 700 may be activated any number of times, and any number of sessions carried out. However, once the trusted state is exited, the trusted state has no memory of previous sessions. Any configuration of the trusted state must be by new input of data 1003, 1102, or by input of previously stored session data or user data 1007, 1008, 1106, 1107.

In the above described specific implementations, specific methods, specific embodiments and modes of operation according to the present invention, a trusted state comprises a computer platform running a set of processes all of which are in a known state. Processes may be continuously monitored throughout a session operating in the trusted state, by a trusted component 202.

Figure 12:
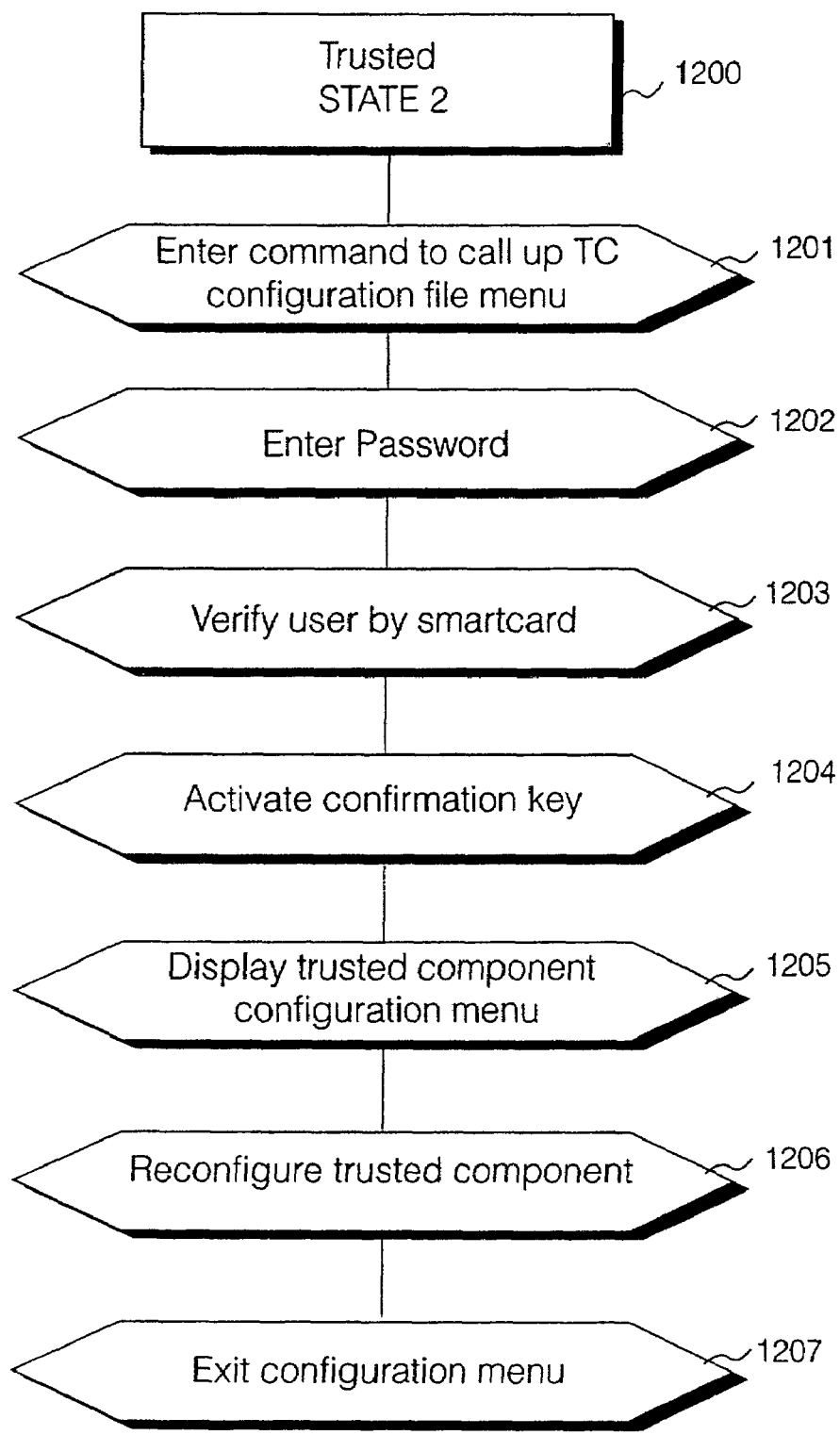
FIG. 12 illustrates schematically a second mode of operation of the computer entity in which reconfiguration of a trusted component may be made by a user.

Referring to FIG. 12 herein, there is illustrated schematically a second mode of operation of a trusted state, in which the trusted component itself 202 can be reconfigured by a user. In the second mode of operation, the trusted component stores a predetermined set of data describing metrics which apply when the computer platform is in the trusted state in which the component itself can be reconfigured. A trusted state 1200 is entered as described previously herein through boot process 704 or re-boot process 705. In the trusted state, a user enters a command to call up a trusted component configuration menu in step 1201. The trusted component configuration menu comprises a set of instructions stored in memory and which is only accessible via a trusted state. In order to make changes to the menu, various levels or security may be applied. For example, a user may be required to enter a secure password, for example a password comprising numbers and letters or other characters in step 1202. The trusted component monitors the trusted state from which the trusted component can be reconfigured by comparing measured integrity metrics from the computer platform whilst in the trusted state, with the set of pre-stored integrity metrics which the trusted component stores in its own memory area. The trusted component will not allow a user to reconfigure the trusted component 202 unless the integrity metrics measured by the trusted component when the computer platform is in the trusted state from which the trusted component can be reconfigured match the pre-stored values in the trusted component's own memory, thereby verifying that the computer platform is operating correctly in the trusted state. The trusted component denies a user reconfiguration of the trusted component if the trusted component detects that the measured integrity metrics of the computer platform do not match those predetermined values which are stored in the trusted component's own internal memory, and are those of the trusted state from which the trusted component can be re-configured.

Additionally, or optionally, the user may be required to insert a smart card into smart card reader 103 in step 1203, following which the trusted component verifies the identity of the user by reading data from the smart card via smart card interface 305. Additionally, the user may be required to input physical confirmation of his or her presence by activation of confirmation key 104 providing direct input into trusted component 202 as described with reference to FIG. 3 herein in step 1204. Data describing the trusted state, for example, which operating system to use, and which applications to use, may be stored on the smart card and used to boot up the computer platform into the trusted state.

Once the security checks including the password, verification by smart card and/or activation of the confirmation key are accepted by the trusted component, the file configuration menu is displayed on the graphical user interface under control of trusted component 202 in step 1205. Reconfiguration of the trusted component can be made using the menu in step 1206 by the user. Depending upon the level of security applied, which is an implementation specific detail of the trusted component configuration menu, the user may need to enter further passwords and make further confirmation key activations when entering data into the menu itself. In step 1207, the user exits the trusted component reconfiguration menu having reconfigured the trusted component.

In the trusted component configuration menu, a user may reconfigure operation of the trusted component. For example, a user may change the integrity metrics used to monitor the computer platform.

By storing predetermined digest data corresponding to a plurality of integrity metrics present in a state inside the trusted component's own memory, this may provide the trusted component with data which it may compare with a digest data of a state into which the computer platform is booted, for the trusted component to check that the computer platform has not been booted into an unauthorized state.

The trusted component primarily monitors boot up of the computer platform. The trusted component does not necessarily take control of the computer platform if the computer platform boots into an unauthorized state, although optionally, software may be provided within the trusted component which enables the trusted component to take control of the computer platform if the computer platform boots into an unauthorized, or an unrecognized state.

When in the trusted state, a user may load in new applications to use in that trusted state, provided the user can authenticate those applications for use in the trusted state. This may involve a user entering a signature data of the required application to the trusted component, to allow the trusted component to verify the application by means of its signature when loading the application into the trusted state. The trusted component checks that the signature of the application is the same as the signature which the user has loaded into the trusted component before actually loading the application. At the end of a session, the application is lost from the platform altogether. The session in the trusted state exists only in temporary memory, for example random access memory, which is reset when the trusted state is exited.

In the above described implementations, a version of a computer entity in which a trusted component resides within a video path to a visual display unit have been described. However, the invention is not dependent upon a trusted component being present in a video path to a visual display unit, it will be understood by persons skilled in the art that the above best mode implementations are exemplary of a large class of implementations which can exist according to the invention.

In the above described best mode embodiment, methods of operation have been described wherein a user is presented with a set of options for selecting a state from a plurality of states, and a user input is required in order to enter a particular desired state. For example a user input may be required to specify a particular type of operating system which is required to be used, corresponding to a state of the computer platform. In a further mode of operation of the specific embodiment, data for selecting a predetermined operating state of the computer platform may be stored on a smart card, which is transportable from computer platform to computer platform, and which can be used to boot up a computer platform into a predetermined required state. The smartcard responds to a set of state selection options presented by a BIOS, and selects one of a plurality of offered choices of state. The BIOS contains the state selections available, and a set of loading programs actually install the various operating systems which provide the states. In this mode of operation, rather than data describing a predetermined state being stored within the first memory area of the trusted component, and the BIOS system obtaining that data from the trusted component in order to boot the computer platform up into a required predetermined state, the information can be accessed from a smart card entered into the smart card reader.

Using such a smart card pre-configured with data for selecting one or a plurality of predetermined states, a user carrying the smart card may activate any such computing entity having a trusted component and computer platform as described herein into a predetermined state as specified by the user, with a knowledge that the computing entity will retain no record of the state after a user session has taken place. Similarly as described with reference to FIGS. 10 and 11 herein, any output user data or configuration data produced during a session may be verified by the smart card, which can be taken away by a user and used to boot up a further different computing entity into the same state, and continue a session on a different computing entity, verifying any information on user data or session data which is to be retrieved, without either computing entity retaining a permanent record of the predetermined state, and without either computing entity retaining any of the processed user data or session configuration data of the predetermined state.

The invention claimed is:

1. A computing entity comprising:
   a computer platform comprising a plurality of physical and logical resources including a first data processor and a first memory;
   a monitoring component comprising a second data processor and a second memory;
   wherein, said computer platform is capable of operating in a plurality of different states, each said state utilising a corresponding respective set of individual ones of said physical and logical resources;
   wherein said monitoring component operates to determine which of said plurality of states is the current operating state of said computer platform.

2. The computing entity as claimed in claim 1, wherein said first memory means contains a set of instructions for configuration of said plurality of physical and logical resources of said computer platform into a pre-determined state.

3. The computing entity as claimed in claim 1, in which exit of said computer platform from each said operating state is monitored by said monitoring component.

4. The computing entity as claimed in claim 1, wherein said monitoring component includes a BIOS file.

5. The computing entity as claimed in claim 1, wherein said computer platform comprises an internal firmware component configured to compute a digest data of a BIOS file data stored in a predetermined memory space occupied by a BIOS file of said computer platform.

6. A method of activating a computing entity comprising a computer platform having a first data processor and a first memory and a monitoring component having a second data processor and a second memory, into an operational state of a plurality of pre-configured operational states into which said computer platform can be activated, said method comprising the steps of:

selecting a state of said plurality of pre-configured operational states to activate for said computer platform;

activating said selected state for said computer platform according to a set of stored instructions;

wherein said monitoring component monitors activation of said selected state by recording data describing which of said plurality of pre-configured states is activated.

7. The method as claimed in claim 6, wherein said monitoring component continues to monitor said selected state after said state has been activated.

8. The method as claimed in claim 7, in which said step of selecting a state of said plurality of pre-configured operational states comprises receiving a selection signal from a smartcard device, said selection signal instructing a BIOS of said computer platform to activate the said computer platform into a said selected state.

9. The method as claimed in claim 6, wherein said monitoring component generates a state signal in response to a signal input directly to said monitoring component by a user of said computing entity, said state signal indicating which said state said computer platform has entered.

10. The method as claimed in claim 9, comprising the step of generating a user menu displayed on a user interface for selection of a said pre-configured state from said plurality of pre-configured states, and said step of generating a state signal comprises generating a state signal in response to a user input accepted through said user interface.

11. The method as claimed in claim 6, wherein said set of stored instructions are stored in a BIOS file resident within said monitoring component.

12. The method as claimed in claim 6, comprising the step of generating a menu for selection of a said pre-configured state from said plurality of pre-configured states.

13. The method as claimed in claim 6, wherein said step of selecting a state of said plurality of pre-configured operational states comprises receiving a selection message from a network connection, said selection message instructing a BIOS file of said computer platform to activate said computer platform into a selected state.

14. The method as claimed in claim 6, wherein said step of monitoring a selected state comprises:

immediately before activating said computer platform, creating by means of a firmware component a digest data of a first pre-allocated memory space occupied by a BIOS file of said computer platform;

writing said digest data to a second pre-allocated memory space to which only said firmware component has write access; and said monitoring component reading said digest data from said second pre-allocated memory space.

15. The method as claimed in claim 6, wherein said step of monitoring said state into which said computer platform is activated comprises:

executing a firmware component to compute a digest data of a BIOS file of said computer platform;

writing said digest data to a predetermined location in said second memory of said monitoring component.

16. The method as claimed in claim 6, wherein said step of activating selected state comprises:

at a memory location of said first memory, said location occupied by a BIOS file of said computer platform, storing an address of said monitoring component which transfers control of said first processor to said monitoring component;

storing in said monitoring component a set of native instructions which are accessible immediately after reset of said first processor, wherein said native instructions instruct said first processor to calculate a digest of said BIOS file and store said digest data in said second memory of said monitoring component; and said monitoring component passing control of said activation process to said BIOS file, once said digest data is stored in said second memory.

17. The method as claimed in claim 6, wherein said step of monitoring said activated state comprises:

after said step of activating said selected sate, monitoring a plurality of logical and physical components to obtain a first set of metric data signals from those components, said metric data signals describing a status and condition of said components;

comparing said first set of metric data signals determined from said plurality of physical and logical components of said computer platform with a set of pre-recorded metric data stored in a memory area reserved for access only by said monitoring component; and comparing said first set of metric data signals obtained directly from said plurality of physical and logical components with said set of pre-stored metric data signals stored in said reserved memory area.

18. The method as claimed in claim 6, further comprising the step of importing from a storage medium data generated when the computer platform was previously in the same selected state.

19. The method as claimed in claim 18, wherein the monitoring component monitors the data imported from the storage medium before it is loaded.

20. A method of storing data at a computing entity comprising a computer platform having a first data processor and a first memory and a monitoring component having a second data processor and a second memory, said method comprising the steps of:

initiating a session on the computing platform;

the monitoring component recording state data describing a current operational state of the computing platform;

generating data in the session; and storing the generated data with reference to the state data so that the generated data may be recovered in a future session of the computing platform in the same operational state.

21. The method as claimed in claim 20, wherein the generated data is encrypted to ensure recovery only in a future session of the computing platform in the same operational state.

* * * * *